(12) United States Patent
Takahashi et al.

(10) Patent No.: US 9,469,294 B2
(45) Date of Patent: Oct. 18, 2016

(54) HYBRID VEHICLE

(71) Applicant: TOYOTA JIDOSHA KABUSHIKI KAISHA, Toyota-shi, Aichi-ken (JP)

(72) Inventors: Tomoya Takahashi, Ebina (JP); Mitsuhiro Tabata, Shizuoka-ken (JP); Takaaki Tanaka, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/759,079

(22) PCT Filed: Jan. 27, 2014

(86) PCT No.: PCT/JP2014/051718
§ 371 (c)(1),
(2) Date: Jul. 2, 2015

(87) PCT Pub. No.: WO2014/115881
PCT Pub. Date: Jul. 31, 2014

(65) Prior Publication Data
US 2015/0367841 A1    Dec. 24, 2015

(30) Foreign Application Priority Data

Jan. 28, 2013  (JP) ................. 2013-013659
Jan. 28, 2013  (JP) ................. 2013-013660
Jan. 28, 2013  (JP) ................. 2013-013661

(51) Int. Cl.
*B60K 6/40*   (2007.10)
*B60K 6/36*   (2007.10)
(Continued)

(52) U.S. Cl.
CPC ............. *B60W 20/30* (2013.01); *B60K 6/36* (2013.01); *B60K 6/38* (2013.01); *B60K 6/40* (2013.01);
(Continued)

(58) Field of Classification Search
CPC .. B60W 20/30; B60W 20/00; B60W 10/113; B60W 10/10; B60W 10/08; B60W 10/02; B60L 15/2054; B60L 11/1861; B60L 11/123; B60L 11/14; Y10S 903/917; Y10T 74/19019; F16H 2200/0052
See application file for complete search history.

(56) References Cited

U.S. PATENT DOCUMENTS 6,634,247 B2 * 10/2003 Pels ..................... B60K 6/26
477/6
6,712,734 B1 * 3/2004 Loeffler ................ B60K 6/40
477/5
(Continued)

FOREIGN PATENT DOCUMENTS

JP    2003-079005 A    3/2003
JP    2005-147312 A    6/2005
(Continued)

*Primary Examiner* — Michael J Zanelli
(74) *Attorney, Agent, or Firm* — Kenyon & Kenyon LLP

(57) ABSTRACT

The present invention is directed to a hybrid vehicle comprising a dual clutch transmission having six forward speed stages, wherein arranged between a first input shaft and a first output shaft of the transmission are: a first gear train for a first speed stage; a third gear train corresponding for a third speed stage; a fifth gear train for a fifth speed stage; and a sixth gear train for a sixth speed stage. A second gear train for a second speed stage and a fourth gear train for a fourth speed stage are arranged between a second input shaft and a second output shaft. A first sleeve is provided between the first gear train and the third gear train; a second sleeve is provided between the fifth gear train and the sixth gear train; and a third sleeve is provided between the second gear train and the fourth gear train. A second MG is provided so as to output drive power to the second input shaft.

11 Claims, 17 Drawing Sheets

(51) Int. Cl.
*B60K 6/442* (2007.10)
*B60K 6/547* (2007.10)
*B60L 11/14* (2006.01)
*B60W 10/02* (2006.01)
*B60W 10/08* (2006.01)
*B60W 10/10* (2012.01)
*B60W 20/00* (2016.01)
*F16H 61/04* (2006.01)
*B60L 11/12* (2006.01)
*B60L 11/18* (2006.01)
*B60L 15/20* (2006.01)
*B60W 10/113* (2012.01)
*B60K 6/38* (2007.10)
*B60K 6/48* (2007.10)
*F16H 3/00* (2006.01)

(52) U.S. Cl.
CPC ............. *B60K 6/48* (2013.01); *B60K 6/547* (2013.01); *B60L 11/123* (2013.01); *B60L 11/14* (2013.01); *B60L 11/1861* (2013.01); *B60L 15/2054* (2013.01); *B60W 10/02* (2013.01); *B60W 10/08* (2013.01); *B60W 10/10* (2013.01); *B60W 10/113* (2013.01); *B60W 20/00* (2013.01); *B60K 6/442* (2013.01); *B60L 2240/421* (2013.01); *B60L 2240/486* (2013.01); *B60L 2240/507* (2013.01); *B60L 2270/145* (2013.01); *B60W 2510/244* (2013.01); *B60W 2520/10* (2013.01); *B60W 2540/10* (2013.01); *B60W 2710/021* (2013.01); *B60W 2710/086* (2013.01); *B60W 2710/1094* (2013.01); *F16H 3/006* (2013.01); *F16H 2200/0052* (2013.01); *Y02T 10/6217* (2013.01); *Y02T 10/6234* (2013.01); *Y02T 10/645* (2013.01); *Y02T 10/705* (2013.01); *Y02T 10/7005* (2013.01); *Y02T 10/7044* (2013.01); *Y02T 10/7077* (2013.01); *Y02T 10/72* (2013.01); *Y02T 10/7275* (2013.01); *Y10S 903/912* (2013.01); *Y10S 903/917* (2013.01); *Y10S 903/93* (2013.01); *Y10T 74/19019* (2015.01)

(56) References Cited

U.S. PATENT DOCUMENTS

| | | |
|---|---|---|
| 2002/0189397 A1 | 12/2002 | Sakamoto et al. |
| 2005/0139035 A1 | 6/2005 | Lee et al. |
| 2007/0028718 A1 | 2/2007 | Lee et al. |
| 2011/0290072 A1* | 12/2011 | Xie ............... B60K 6/48 74/665 A |
| 2011/0296948 A1* | 12/2011 | Yoshimi ............ F16H 3/006 74/665 R |
| 2012/0090428 A1* | 4/2012 | Bowen ............. F16D 23/12 74/665 D |
| 2012/0115677 A1* | 5/2012 | Sakai ............... B60K 6/387 477/5 |

FOREIGN PATENT DOCUMENTS

| | | |
|---|---|---|
| JP | 2005-186931 A | 7/2005 |
| JP | 2008-120166 A | 5/2008 |
| JP | 2010-042708 A | 2/2010 |
| JP | 2010-208376 A | 9/2010 |
| KR | 10-1113665 * | 3/2012 |

* cited by examiner

FIG. 1

HYBRID VEHICLE

CROSS-REFERENCE TO RELATED APPLICATIONS

This is a national phase application based on the PCT International Patent Application No. PCT/JP2014/051718 filed Jan. 27, 2014, claiming priority to Japanese Patent Application Nos. 2013-013659, 2013-013660 and 2013-013661, all filed Jan. 28, 2013, the entire contents of all of which are incorporated herein by reference.

TECHNICAL FIELD

The present invention relates to a hybrid vehicle having a dual clutch transmission.

BACKGROUND ART

There is known a dual clutch transmission where gear trains are provided to each of a portion between a first input shaft and an output system and a portion between a second input shaft and the output system, and one of the two input shafts is selectively connected to an internal combustion engine. Further, there is known a hybrid vehicle where such a dual clutch transmission is mounted, electric motors are connected to the input shafts respectively, and gear trains corresponding to first, third and fifth speed stages are provided between one of the input shafts and the output system while another gear trains corresponding to second, forth, and sixth speed stages being provided between the other one of the input shafts and the output system (see the patent literature 1). In addition, there are the patent literatures 2 and 3 as prior art literatures of the present invention.

CITATION LIST

Patent Literature

PTL1: JP-A-2003-079005
PTL2: JP-A-2010-208376
PTL3: JP-A-2008-120166

SUMMARY OF INVENTION

Technical Problem

In the vehicle of the patent literature 1, three sets of gear trains are provided for each portion between each input shaft and the output system. In this case, it is necessary to prepare or each input shaft, two hub sleeves and two driving actuators for changing the gear trains to be used for rotation transmission. Therefore, there is a possibility that the vehicle cost rises.

Then, the present invention aims to provide a hybrid vehicle capable of reducing the vehicle cost.

Solution to Problem

A hybrid vehicle as one aspect of the present invention is a hybrid vehicle comprising an internal combustion engine, and a transmission as a dual clutch transmission having: an input system including a first input shaft connected to the internal combustion engine via a first clutch and a second input shaft connected to the internal combustion engine via a second clutch; an output system connected to drive wheels in a power transmittable manner; 4n+2 (n: integer one or more) sets of gear trains provided in such a way that one part of the 4n+2 sets of gear trains intervene between the first input shaft and the output system and all remaining sets of gear trains intervene between the second input shaft and the output system, the 4n+2 sets of gear trains corresponding to speed stages for forward travel respectively, the speed stages being different from each other in a gear ratio; and a plurality of connecting mechanisms, each of the plurality connecting mechanisms being provided between a pair of gear trains which are arranged next to each other within the 4n+2 sets of gear trains to selectively realize rotational transmission by one of the pair of gear trains, wherein with respect to the 4n+2 sets of gear trains, 2n+2 sets of gear trains intervene between the first input shaft and the output system, and remaining 2n sets of gear trains intervene between the second input shaft and the output system, and the hybrid vehicle further comprises an electric motor provided so as to output power to the second input shaft or the output system.

According to the hybrid vehicle of the present invention, since the number of gear trains which intervene between the first input shaft and the output system is even-numbered and also the number of gear trains which intervene between the second input shaft and the output system is even-numbered, it is not necessary to prepare a connecting mechanism for each gear train. In this case, since it is possible to reduce the number of connecting mechanisms, it is possible to reduce the vehicle cost.

In one embodiment of the present invention, only one gear train group may be provided between the first input shaft and the output system, the gear train group being composed of two of the gear trains corresponding to speed stages which are next to each other respectively. In this case, between the second input shaft and the output system, the gear train group composed of two speed stages which are next to each other is not provided. And, there is only one gear train group between the first input shaft and the output system. Due to this, when a gear change is executed except the gear change between the gear trains composing the gear train group, by controlling appropriately the first clutch and the second clutch, it is possible to suppress from occurring, a period when the drive wheels are not driven, so-called the torque loss, in gear change. When a gear change is executed between the speed stages composing the gear train group, the electric motor is capable of assisting the drive wheels to be driven. Due to this, it is possible to suppress the torque loss from occurring. In this way, the assist by the electric motor may be executed in gear change between the speed stages of the gear train group. Accordingly, it is possible to keep the assist by the electric motor to the minimum.

In one embodiment of the present invention, the 4n+2 sets of gear trains may intervene between the input system and the output system in such a way that: the gear train corresponding to a specific even-numbered stage which is one of even-numbered stages and the gear train corresponding to a specific odd-numbered stage which is either one of an odd-numbered stage which is one stage lower or an odd-numbered stage which is one stage higher than the specific even-numbered stage intervene between the first input shaft and the output system; and, with respect to the gear trains corresponding to remaining speed stages except the specific even-numbered stage and the specific odd-numbered stage, even numbered gear trains intervene between the first input shaft and the output system and even numbered gear trains intervene between the second input shaft and the output shaft. According to this embodiment, the specific even-numbered stage and the specific odd-numbered stage intervene between the first input shaft and the output system.

And, the electric motor is provided so as to output power to the second input shaft or the output system. Therefore, when the gear change is executed between the specific even-numbered stage and the specific odd-numbered stage, it is possible to assist the drive wheels to be driven with the power outputted from the electric motor.

In this embodiment, the hybrid vehicle may further comprise a control device which is configured to control the electric motor, in a case that a speed stage is changed from one of the specific even-numbered stage and the specific odd-numbered stage to another one of the specific even-numbered stage and the specific odd-numbered stage, to suppress fluctuation of power to be transmitted to the drive wheels. According to this embodiment, when the gear change is executed between the specific even-numbered stage and the specific odd-numbered stage, it is possible to suppress a rapid change of vehicle speed. Therefore, it is possible to suppress the gear change shock in gear change.

Further, the specific even-numbered stage may be a highest stage within speed stages of the transmission, and the specific odd-numbered stage may be an odd-numbered stage which is one stage lower than the highest stage, and the hybrid vehicle may comprise a gear change banning device which is configured to, in a case of determining that fluctuation of the power to be transmitted to the drive wheels are impossible to be suppressed by the electric motor when a gear change from one of the specific even-numbered stage and the specific odd-numbered stage to another one of the specific even-numbered stage and the specific odd-numbered stage has been required, ban the gear change. By banning the gear change in this way, it is possible to suppress a rapid change of vehicle speed. Therefore, it is possible to suppress the gear change shock in gear change.

In one embodiment of the hybrid vehicle of the present invention, the transmission may be the dual clutch transmission such that, with respect to the 4n+2 sets of gear trains, the gear trains corresponding to odd-numbered stages and one of the gear trains corresponding to a specific even-numbered stage which is one of fourth or higher even-numbered stages intervene between the first input shaft and the output system, while gear trains corresponding to remaining even-numbered stages except the specific even-numbered stage intervene between the second input shaft and the output system, the first clutch and the second clutch may be controlled to connect any one of the first input shaft and the second input shaft to the internal combustion engine in a power transmittable manner, and also to shut off power transmission between another one of the first input shaft and the second input shaft and the internal combustion engine, and the hybrid vehicle may further comprise a transmission control device which is configured, in a case that shift-down for changing the speed stage of the transmission from the specific even-numbered stage to a speed stage which is one stage lower than the specific even-numbered stage is required when the hybrid vehicle is traveling with the internal combustion engine in a state that the speed stage of the transmission has been changed to the specific even-numbered stage, to change the speed stage of the transmission from the specific even-numbered stage to the speed stage which is one stage lower than the specific even-numbered stage with driving the drive wheels by the electric motor when the fluctuation of drive power of the hybrid vehicle at a moment of the shift-down is possible to be reduced by the electric motor, and to change the speed stage of the transmission from the specific even-numbered stage to the speed stage which is two stages lower than the specific even-numbered stage with controlling the second clutch to transmit power of the internal combustion engine to the second input shaft when the fluctuation of drive power of the hybrid vehicle at a moment of the shift-down is impossible to be reduced by the electric motor.

In this embodiment, when the speed stage of the transmission has been changed to the specific even-numbered stage and the vehicle is traveling with the internal combustion engine, in a case that the electric motor can reduce the fluctuation of drive power of the vehicle at the moment of shift-down, the speed stage of the transmission is changed from the specific even-numbered stage to the speed stage which is one stage lower than the specific even-numbered stage, while the drive wheels are being driven by means of the electric motor. In this case, it is possible to eliminate a period when the drive wheels are not driven, so-called the torque loss occurs, in gear change. Further, it is possible to reduce the fluctuation of drive power in gear change by the electric motor. Therefore, it is possible to suppress the gear change shock. On the other hand, in a case that it is impossible to reduce the fluctuation of drive power of the vehicle at the moment of shift-down, while the second clutch is controlled to transmit power from the internal combustion to the second input shaft, the speed stage of the transmission is changed from the specific even-numbered stage to the speed stage which is two stages lower than the specific even-numbered stage. The gear train corresponding to the speed stage which is two stages lower intervenes between the second input shaft and the output system. Due to this, while the power transmission between the first input shaft and the output system is established by the gear train corresponding to the specific even-numbered stage, it is possible to establish the power transmission between the second input shaft and the output system by the gear train corresponding to the speed stage which is two stages lower than the specific even-numbered stage. Accordingly, it is possible to eliminate a period when the torque loss occurs by changing the speed stage of the transmission to the speed stage which is two stages lower. Therefore, it is possible to suppress the gear change shock.

In this embodiment, the number of gear trains intervening between the input system and the output system and the specific even-numbered stage may be set as appropriate as long as they are satisfied with the above conditions. For example, the transmission may be provided with six sets of gear trains, and the specific even-numbered state may be a sixth speed stage.

In one embodiment of the hybrid vehicle of the present invention, the transmission may be the dual clutch transmission such that, with respect to the 4n+2 sets of gear trains, the gear trains corresponding to odd-numbered stages and one of the gear trains corresponding to a specific even-numbered stage which is one of even-numbered stages intervene between the first input shaft and the output system, while the gear trains corresponding to remaining even-numbered stages except the specific even-numbered stage intervene between the second input shaft and the output system, and the hybrid vehicle may further comprise a gear changing device which is configured to change the speed stage of the transmission from the specific even-numbered stage to an odd-numbered stage which is one stage lower than the specific even-numbered stage, in a case that, when the hybrid vehicle is traveling in a state that the speed stage of the transmission has been changed to the specific even-numbered stage, a required torque which is required to the hybrid vehicle is within a predetermined assist determination range where a maximum value of torque the electric motor capable of outputting is an upper limit, and also that an amount of torque change of the required torque is within a predetermined determination range set beforehand.

In this embodiment, in a case that the required torque is within the assist determination range and also the amount of torque change of the required torque is within the determination range, the speed stage is changed from the specific even-numbered stage to the odd-numbered stage which is one stage lower than the specific even-numbered stage. That is, in a case that the drive wheels can be driven by means of the electric motor and also the fluctuation of the required torque is small, the speed stage is changed from the specific even-numbered stage to the odd-numbered stage which is one stage lower than the specific even-numbered stage in advance. Due to this, it is possible to drive the drive wheels by means of the electric motor in gear change. Accordingly, it is possible to suppress the gear change shock from occurring in gear change.

In this embodiment, the specific even-numbered stage may be a highest stage of the transmission. In this case, the highest stage and the speed stage which is one stage lower than the highest stage are provided to a shared input shaft. In such a vehicle, when the kickdown that the speed stage is changed to a lower speed stage, is required in a state that the electric motor is incapable of assisting because the required drive power to the vehicle has gradually increased at a slope or the like while the vehicle is traveling at the highest stage of the transmission, it is impossible to change the speed stage to a speed stage which is one stage lower than the highest stage, but the speed stage is changed to a speed stage which is two stages lower than the highest stage, which is provided to the other input shaft. In this case, in comparison with a degree of increase of pressing an accelerator pedal, a degree of increase of the rotational speed of the internal combustion engine becomes larger. Due to this, a feeling of strangeness might be given to a driver. In this embodiment, while the electric motor is capable of assisting, the speed stage is changed to the odd-numbered stage which is one stage lower beforehand. Therefore, it is possible to suppress such a situation that in comparison with the degree of increase of pressing an accelerator pedal, the degree of increase of the rotational speed of an internal combustion engine becomes larger. Due to this, it is possible to suppress a feeling of strangeness which might be given to a driver.

Further, the upper limit of the assist determination range may be the maximum value of torque the electric motor capable of outputting and the assist determination range may be set to a neighborhood of the maximum value. By setting the assist determination range in this way, it is possible to limit the time to execute a gear change from the specific even-numbered stage to the odd-numbered stage which is one stage lower than the specific even-numbered stage. Due to this, it is possible to suppress unnecessary shift-down.

The gear changing device may be configured to include an assistive device which is configured to, in a case that the speed stage of the transmission is changed from the specific even-numbered stage to the odd-numbered stage which is one stage lower than the specific even-numbered stage, control the electric motor so as not to fluctuate power to be transmitted to the drive wheels in gear change. By controlling the electric motor in this way, it is possible to suppress the gear change shock from occurring in gear change.

BRIEF DESCRIPTION OF DRAWINGS

FIG. 1 is a diagram showing a hybrid vehicle according to a first embodiment of the preset invention.

DESCRIPTION OF EMBODIMENTS

First Embodiment

Figure 1:
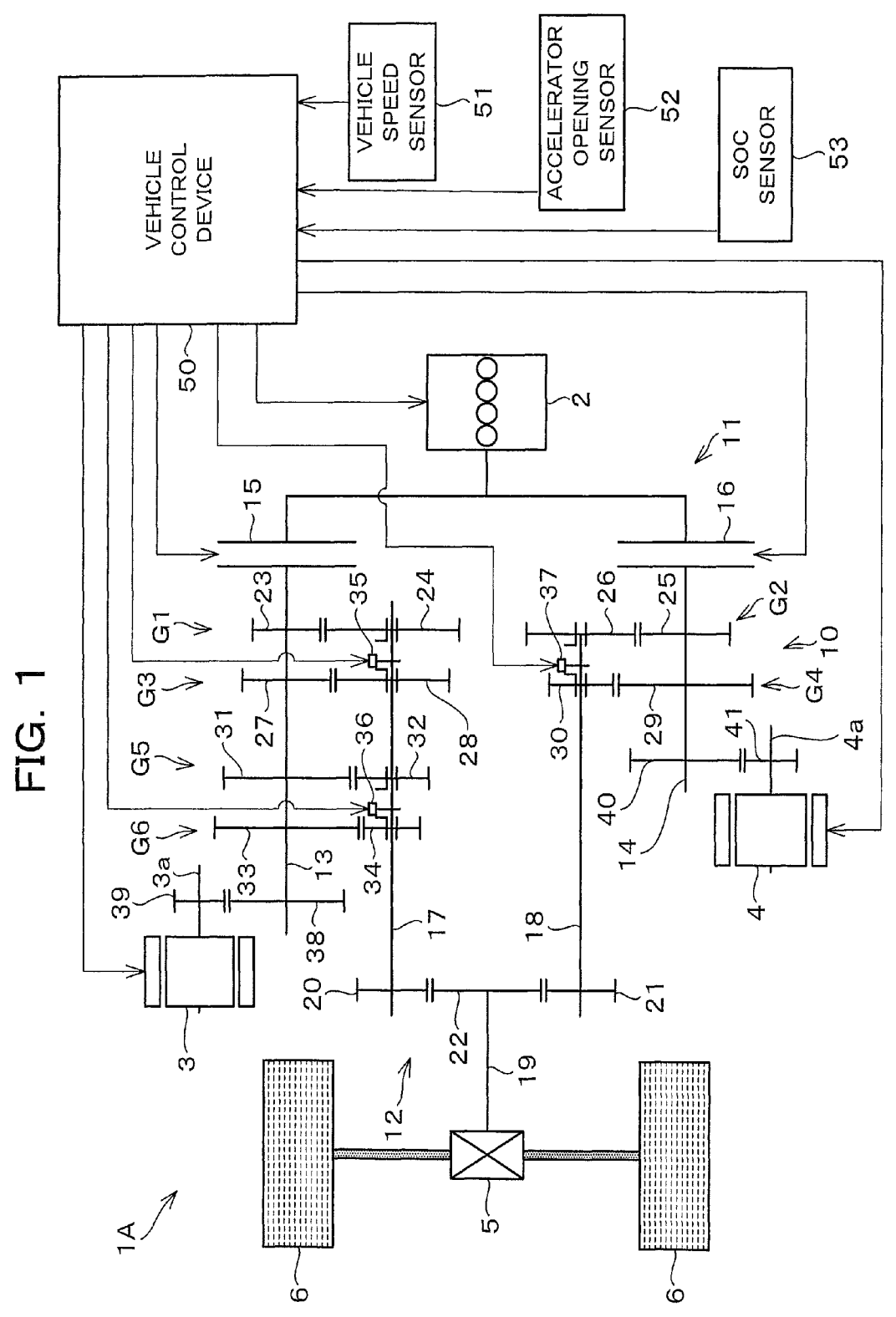
Figure 2:
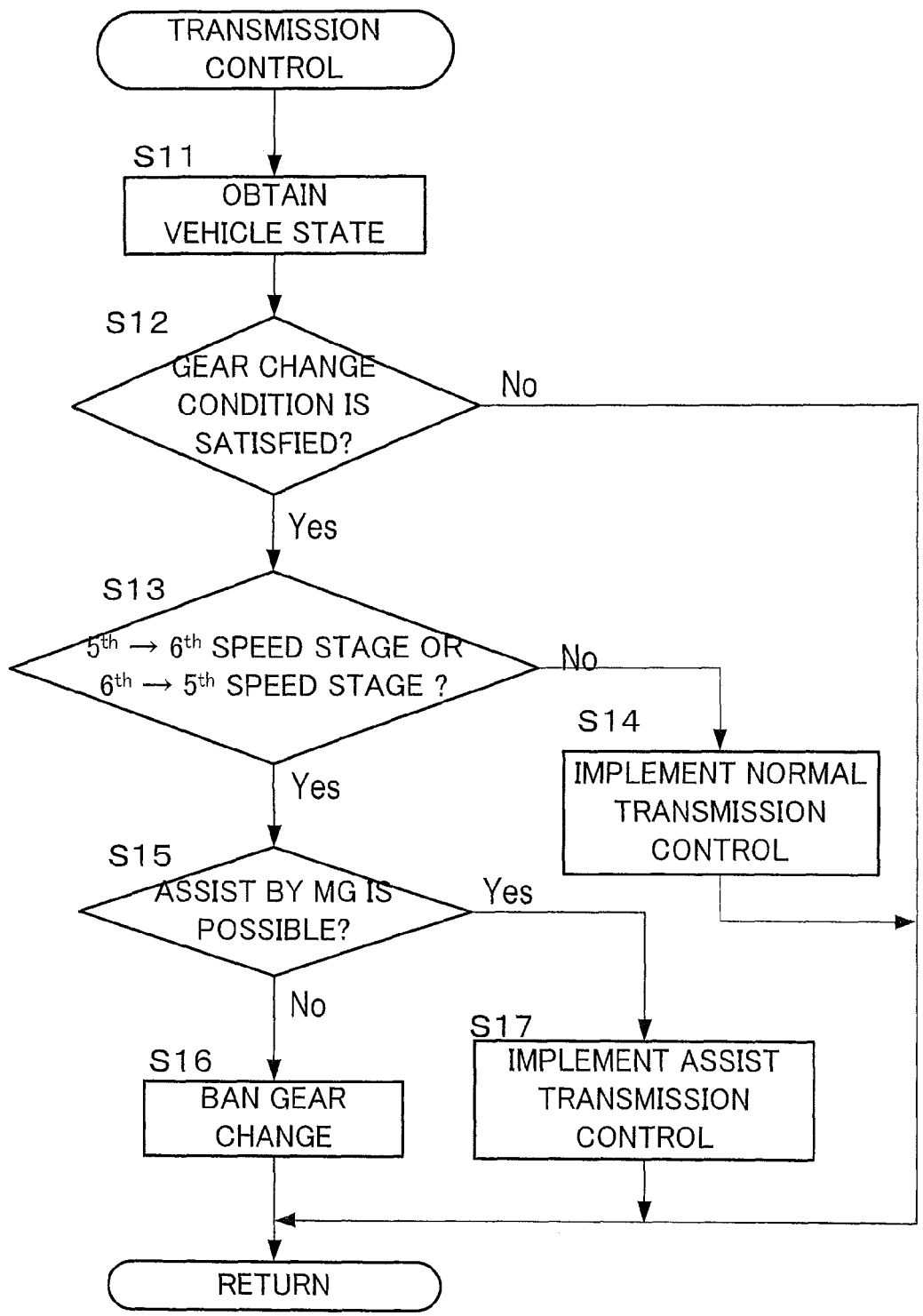
FIG. 2 is a flow chart showing a transmission control routine executed by a vehicle control device.

FIG. 1 schematically shows a hybrid vehicle according to a first embodiment of the present invention. This hybrid vehicle 1A comprises, as driving sources for traveling, an internal combustion engine (hereinafter, sometimes referred to as the "engine") 2, a first motor generator (hereinafter, sometimes abbreviated to the "first MG") 3, and a second motor generator (hereinafter, sometimes abbreviated to the "second MG") 4 as an electric motor. The engine 2 is a well-known spark ignition type of internal combustion engine having plural cylinders. The first MG 3 and the second MG 4 are well-known ones each of which is mounted on a hybrid vehicle to function as an electric motor and also an electric generator. Therefore, the detailed explanation of those driving sources is omitted.

The vehicle 1A comes with a transmission 10 having six forward speed stages. The transmission 10 is built up as a dual clutch type transmission. The transmission 10 comprises an input system 11 and an output system 12. The input system 11 includes a first input shaft 13 and a second input shaft 14. The first input shaft 13 is connected to the engine 2 via a first clutch 15. The second input shaft 14 is connected to the engine 2 via a second clutch 16. The first clutch 15 is a well-known friction clutch capable of changing over between a fully engaged state that the input shaft 13 rotates at a same rotational speed as the engine 2 rotates and a released state that power transmission between the engine 2 and the input shaft 13 is shut off. The second clutch 16 is also a well-known friction clutch capable of changing over between a fully engaged state that the input shaft 14 rotates at a same rotational speed as the engine 2 rotates and a released state that power transmission between the engine 2 and the input shaft 14 is shut off. Therefore, it is possible to make each of the clutches 15 and 16 move into a state, so-called a half clutch state, that power is transmitted between the engine 2 and each of the input shafts 13 and 14, while each of the input shafts 13 and 14 rotates at a different rotational speed from the engine 2 rotates.

The output system 12 includes a first output shaft 17, a second output shaft 18, and a drive shaft 19. As shown in this figure, the first output shaft 17 is provided with a first output gear 20. And, the second output shaft 18 is provided with a second output gear 21. The drive shaft 19 is provided with a driven gear 22. Each of the first output gear 20 and the second output gear 21 is engaged with the driven gear 22. The drive shaft 19 is connected to a differential mechanism 5 in a power transmittable manner. The differential mechanism 5 is a well-known one for distributing inputted power to right and left drive wheels 6.

A first to a sixth gear trains G1 to G6 corresponding to different speed stages from each other intervene between the input system 11 and the output system 12. As shown in this figure, the first gear train G1, the third gear train G3, the fifth gear train G5, and the sixth gear train G6 intervene between the first input shaft 13 and the first output shaft 17. The second gear train G2 and the fourth gear train G4 intervene between the second input shaft 14 and the second output shaft 18.

The first gear train G1 includes a first drive gear 23 and a first driven gear 24 which are engaged with each other, and the second gear train G2 includes a second drive gear 25 and a second driven gear 26 which are engaged with each other. The third gear train G3 includes a third drive gear 27 and a third driven gear 28 which are engaged with each other, and the fourth gear train G4 includes a fourth drive gear 29 and a fourth driven gear 30 which are engaged with each other. The fifth gear train G5 includes a fifth drive gear 31 and a fifth driven gear 32 which are engaged with each other, and the sixth gear train G6 includes a sixth drive gear 33 and a sixth driven gear 34 which are engaged with each other. Each of the first to sixth gear trains G1 to G6 is provided so that the corresponding drive gear and the corresponding driven gear are always engaged with each other. Gear ratios different from each other are set to the gear trains G1 to G6 respectively. The gear ratios get smaller according to this order: the first gear train G1; the second gear train G2; the third gear train G3; the fourth gear train G4; the fifth gear train G5; and the sixth gear train G6. Therefore, the first gear train G1, the second gear train G2, the third gear train G3, the fourth gear train G4, the fifth gear train G5, and the sixth gear train G6 correspond to a first speed stage, a second speed stage, a third speed stage, a fourth speed stage, a fifth speed stage, and a sixth speed stage respectively.

The first drive gear 23, the third drive gear 27, the fifth drive gear 31, and the sixth drive gear 33 are fixed to the first input shaft 13 so as to rotate integrally with the first input shaft 13. On the other hand, the first driven gear 24, the third driven gear 28, the fifth driven gear 32, and the sixth driven gear 34 are supported on the first output shaft 17 so as to rotate relatively with respect to the first output shaft 17. The second drive gear 25 and the fourth drive gear 29 are fixed to the second input shaft 14 so as to rotate integrally with the second input shaft 14. On the other hand, the second driven gear 26 and the fourth driven gear 30 are supported on the second output shaft 18 so as to rotate relatively with respect to the second output shaft 18.

A first sleeve 35 and a second sleeve 36 are provided to the first output shaft 17. The first and second sleeves 35 and 36 are supported on the first output shaft 17 so as to be allowed to rotate integrally with the first output shaft 17 and also to move in an axis line direction of the first output shaft 17. The first sleeve 35 is provided between the first gear train G1 and the third gear train G3 which are arranged next to each other. The first sleeve 35 is provided so as to change its position between a first speed position where the first sleeve 35 is engaged with the first driven gear 24 so that the first driven gear 24 rotates integrally with the first output shaft 17, a third speed position where the first sleeve 35 is engaged with the third driven gear 28 so that the third driven gear 28 rotates integrally with the first output shaft 17, and a released position where the first sleeve 35 is engaged with neither the first driven gear 24 nor the third driven gear 28. The second sleeve 36 is provided between the fifth gear train G5 and the sixth gear train G6 which are arranged next to each other. The second sleeve 36 is provided so as to change its position between a fifth speed position where the second sleeve 36 is engaged with the fifth driven gear 32 so that the fifth driven gear 32 rotates integrally with the first output shaft 17, a sixth speed position where the second sleeve 36 is engaged with the sixth driven gear 34 so that the sixth driven gear 34 rotates integrally with the first output shaft 17, and a released position where the second sleeve 36 is engaged with neither the fifth driven gear 32 nor the sixth driven gear 34.

A third sleeve 37 is provided to the second output shaft 18. The third sleeve 37 is supported on the second output shaft 18 so as to be allowed to rotate integrally with the second output shaft 18 and also to move in an axis line direction of the second output shaft 18. The third sleeve 37 is provided between the second gear train G2 and the fourth gear train G4 which are arranged next to each other. The third sleeve 37 is provided so as to change its position between a second speed position where the third sleeve 37 is engaged with the second driven gear 26 so that the second driven gear 26 rotates integrally with the second output shaft 18, a fourth speed position where the third sleeve 37 is engaged with the fourth driven gear 30 so that the fourth driven gear 30 rotates integrally with the second output shaft 18, and a released position where the third sleeve 37 is engaged with neither the second driven gear 26 nor the fourth driven gear 30.

The speed stage of the transmission 10 is the first speed stage, when the position of the first sleeve 35 has been changed to the first speed position and the positions of the second and third sleeves 36 and 37 have been changed to the released positions respectively. The speed stage of the transmission 10 is the second speed stage, when the position of the third sleeve 37 has been changed to the second speed position and the positions of the first and second sleeves 35 and 36 have been changed to the released positions respectively. The speed stage of the transmission 10 is the third speed stage, when the position of the first sleeve 35 has been changed to the third speed position and the positions of the second and third sleeves 36 and 37 have been changed to the released positions respectively. The speed stage of the transmission 10 is the fourth speed stage, when the position of the third sleeve 37 has been changed to the fourth speed position and the positions of the first and second sleeves 35 and 36 have been changed to the released positions respectively. The speed stage of the transmission 10 is the fifth speed stage, when the position of the second sleeve 36 has been changed to the fifth speed position and the positions of the first and third sleeves 35 and 37 have been changed to the released positions respectively. The speed stage of the transmission 10 is the sixth speed stage, when the position of the second sleeve 36 has been changed to the sixth speed position and the positions of the first and third sleeves 35 and 37 have been changed to the released positions respectively.

Although the illustration is omitted, the transmission 10 is provided with plural drive actuators for driving the sleeves 35 to 37 respectively. Since the drive actuators may be well-known hydraulic drive mechanisms or well-known motor drive mechanisms for transmissions, the explanation of the drive actuators will be omitted. Also, though the illustration is omitted, a synchromesh mechanism is provided for each driven gear on each of the output shafts 17 and 18. The synchromesh mechanism makes, when each of the sleeves 35 to 37 is engaged with each of the driven gears 24, 26, 28, 30, 32, and 34, the sleeve and the driven gear rotate in synchronism with each other. As this synchromesh mechanism, a synchromesh mechanism which synchronizes rotations by friction engagement, such as a well-known key synchromesh mechanism, may be employed. Therefore, the detailed explanation of such a synchromesh mechanism will be omitted.

The first input shaft 13 is provided with a first driven gear 38. An output shaft 3a of the first MG 3 is provided with a first drive gear 39 being engaged with the first driven gear 38. Thereby, the first MG 3 is connected to the first input shaft 13 in a power transmittable manner. The second input shaft 14 is provided with a second driven gear 40. An output shaft 4a of the second MG 4 is provided with a second drive gear 41 being engaged with the second driven gear 40. Thereby, the second MG 4 is connected to the second input shaft 14 in a power transmittable manner.

In this vehicle 1A, when the vehicle 1A is made to go back, the transmission 10 changes its state to the first speed stage or the second speed stage, and the drive wheels 6 are driven by the first MG 3 or the second MG 4.

The operations of the first clutch 15, the second clutch 16, and the sleeves 35 to 37 are controlled by a vehicle control device 50. Also, the operations of the engine 2, the first MG 3, and the second MG 4 are controlled by the vehicle control device 50. The vehicle control device 50 is configured as a computer unit including a microprocessor and peripheral devices necessary for operations of the microprocessor, such as a RAM and a ROM. The vehicle control device 50 holds various kinds of control programs for traveling appropriately the vehicle 1A. The vehicle control device 50 controls control objects, such as the engine 2, and the MGs 3 and 4, by implementing the control programs. To the vehicle control device 50, various kinds of sensors are connected for obtaining information on the vehicle 1A. To the vehicle control device 50, for example, a vehicle speed sensor 51, a accelerator opening sensor 52, and an SOC sensor 53 are connected. The vehicle speed sensor 51 outputs a signal according to the speed (the vehicle speed) of the vehicle 1A. The accelerator opening sensor 52 outputs a signal according to the amount of depressing of the accelerator pedal, that is, the accelerator opening degree. The SOC sensor 53 outputs a signal according to a residual quantity of a battery (not illustrated) which is connected to the MGs 3 and 4.

Further, to the vehicle control device 50, a shift lever not illustrated is also connected. Besides the above, various kinds of sensors and switches are also connected to the vehicle control device 50. However, the illustrations of those will be omitted.

The vehicle 1A provides plural traveling modes. As the traveling modes, there are an EV traveling mode where the drive wheels 6 are driven with the first MG 3 or the second MG 4 and an engine traveling mode where the drive wheels 6 are driven mainly with the engine 2. The vehicle control device 50 changes the traveling mode of the vehicle 1A, based on the vehicle speed and the like. The vehicle control device 50 changes the traveling mode to the EV traveling mode when the vehicle speed is lower than a predetermined determination speed, for example. In the EV traveling mode, the vehicle control device 50 changes both of the first clutch 15 and the second clutch 16 to the released state to be separated off from the engine 2. On the other hand, when the vehicle speed is the determination speed or higher, or the residual quantity of the battery has become smaller than a determination value, the vehicle control device 50 changes the traveling mode to the engine traveling mode. In the engine traveling mode, the vehicle control device 50 changes to the fully engaged state, one clutch, either the first clutch 15 or the second clutch 16, which is provided for the input shaft having the speed stage being used for the traveling of the vehicle 1A, and changes the other clutch to the released state.

In addition, the vehicle control device 50 changes the speed stage of the transmission 10, based on the vehicle speed and the accelerator opening degree. In the ROM of the vehicle control device 50, a gear change diagram is stored as a map, the gear change diagram showing a relation between the vehicle speed and accelerator opening degree and the speed stages. Since the gear change diagram is a well-known one which is generally used for controlling a transmission, the detailed explanation of the gear change diagram will be omitted. The vehicle control device 50 determines the speed stage according to a current traveling state of the vehicle 1A, based on the gear change diagram. Then, the vehicle control device 50 controls the operations of the sleeves 35 to 37 so that the transmission 10 moves into the speed stage determined.

As mentioned above, in the transmission 10, the fifth gear grain G5 corresponding to the fifth speed stage and the sixth gear train G6 corresponding to the sixth speed stage intervene between the first input shaft 13 and the first output shaft 17. Further, with respect to the gear train G5 and the gear train G6, the state of connection to the first output shaft 17 is controlled by means of the second sleeve 36 shared by the gear trains G5 and G6. Due to this, it is impossible to connect both of the gear trains G5 and G6 to the first output shaft 17 at the same time. Then, the vehicle control device 50 makes the second MG 4 output power to assist the drive wheels 6 to be driven, in a case of shift-up from the fifth speed stage to the sixth speed stage, or a case of shift-down from the sixth speed stage to the fifth speed stage.

FIG. 2 shows a transmission control routine which the vehicle control device 50 implements for controlling the transmission 10 in the above mentioned manners. This control routine is implemented repeatedly at predetermined intervals while the vehicle 1A is traveling.

In this control routine, first, the vehicle control device 50 obtains the state of the vehicle 1A at step S11. As the state of the vehicle 1A, obtained are the vehicle speed, the accelerator opening degree, the residual quantity of the battery, and the current speed stage, for example. At this step, the vehicle control device 50 calculates based on the accelerator opening degree, a drive power required by a driver to the vehicle 1A (a required drive power). Since this calculation method may be a well-known one, the explanation of such a calculation method will be omitted. At this step, in addition to the above mentioned kinds of information, other kinds of information with respect to the state of the vehicle 1A are also obtained.

At the next step S12, the vehicle control device 50 determines whether a gear change condition for changing the speed stage of the transmission 10 from the current speed stage to the other speed stage, has been satisfied or not. It may be determined in a well-known method using the gear change diagram whether the gear change condition has been satisfied. When it is determined that the gear change condition has not been satisfied, the control routine of the current turn is ended. On the other hand, when it is determined that the gear change condition has been satisfied, the vehicle control device 50 goes to step S13 to determine whether the current gear change is either a gear change from the fifth speed stage to the sixth speed stage or a gear change from the sixth speed stage to the fifth speed stage. This determination may be also made with the gear change diagram. When it is determined that the current gear change is neither the gear change from the fifth speed stage to the sixth speed stage nor the gear change from the sixth speed stage to the fifth speed stage, the vehicle control device 50 goes to step S14 to implement a normal transmission control. In the normal transmission control, first, the vehicle control device 50 controls the first sleeve 35 or the third sleeve 37, so that the input shaft not relating to the current traveling and the output system 12 are connected in a power transmittable manner via the gear train corresponding to the speed stage after the gear change. Next, in a case of the engine traveling mode, the vehicle control device 50 changes from the fully engagement state to the released state, the state of clutch relating to the gear train of the current speed stage, while changing from the released state to the fully engagement state, the state of the clutch relating to the gear train of the speed stage after the gear change. After that, the vehicle control device 50 controls the first sleeve 35 or the third sleeve 37 so that the rotation transmission via the gear train of the speed stage before the gear change is shut off. As such a method of changing speed stages, a method similar to a method of a well-known dual clutch transmission may be employed. Therefore, the detailed explanation of the method will be omitted. After that, the control routine of the current turn is ended.

On the other hand, when determining that the current gear change is either the gear change from the fifth speed stage to the sixth speed stage or the gear change from the sixth speed stage to the fifth speed stage, the vehicle control device 50 goes to step S15 to determine whether the second MG 4 is capable of assisting the drive wheels 6 to be driven in gear change. As well known, the power a motor generator is capable of outputting changes according to the residual quantity of the battery, the temperature of the battery, the temperature of the second MG 4, and the like. Then, the vehicle control device 50 calculates the upper limit of the drive power the second MG 4 is currently capable of outputting. The vehicle control device 50 determines that the assist is impossible, when the upper limit of the drive power is smaller than the required drive power to the vehicle 1A. Additionally, when the second MG 4 has some problem, the vehicle control device 50 also determines that the assist is impossible. When determining that the assist using the second MG 4 is impossible, the vehicle control device 50 goes to step S16 to ban the gear change from the fifth speed stage to the sixth speed stage or the gear change from the sixth speed stage to the fifth speed stage. When the gear change is banned in this way, the vehicle control device 50 makes the engine 2 and the MGs 3 and 4 output powers so that the drive wheels 6 are driven appropriately according to the vehicle speed and the accelerator opening degree. After that, the vehicle control device 50 ends the control routine of the current turn.

On the other hand, when determining that the assist using the second MG 4 is possible, the vehicle control device 50 goes to step S17 to implement an assist transmission control. In the assist transmission control, first, the vehicle control device 50 changes the position of the third sleeve 37 to the fourth speed position. Next, the vehicle control device 50 drives the drive wheels 6 by making the second MG 4 output a drive power corresponding to the required drive power while releasing the first clutch 15. Subsequently, the vehicle control device 50 changes the position of the second sleeve 36 to a position, within the fifth speed position or the sixth speed position, which corresponds to the speed stage after the gear change. Next, the vehicle control device 50 lowers, while engaging the first clutch 15, the drive power outputted by the second MG 4 so that the vehicle speed does not suddenly change. After that, the vehicle control device 50 changes the position of the third sleeve 37 to the released position. After that, the vehicle control device 50 ends the control routine of the current turn.

As mentioned above, according to the vehicle 1A of the first embodiment, the sixth gear train G6 corresponding to the sixth speed stage is arranged between the first input shaft 13 and the output system 12. Thereby, it is possible to execute the gear change between speed stages from the first speed stage to the sixth speed stage, just by providing the three sleeves 35 to 37 and the drive actuators for driving the three sleeves 35 to 37 respectively to the transmission 10. Accordingly, it is possible to reduce the vehicle cost.

When the second MG 4 is capable of assisting the drive wheels 6 to be driven at the gear changes from the fifth to the sixth speed stage and from the sixth to the fifth speed stage, the assist is executed by the second MG 4 in gear change. Thereby, it is possible to suppress a sudden change of the vehicle speed. Further, when the second MG 4 is incapable of assisting the drive wheels 6 in gear change, the gear change is banned. Thereby, also in this case, it is possible to suppress a sudden change of the vehicle speed. Therefore, it is possible to suppress a gear change shock.

Figure 3:
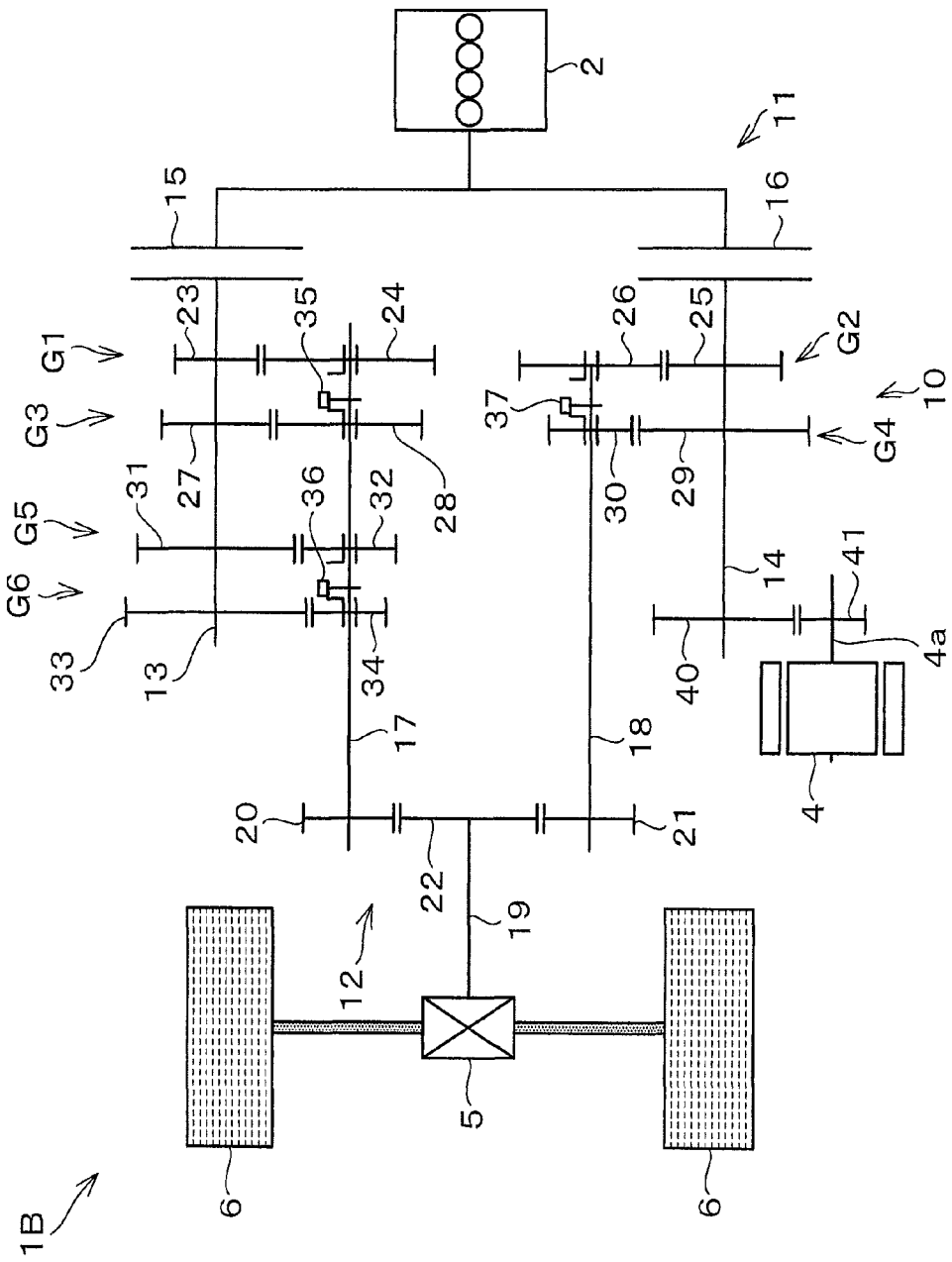
FIG. 3 is a diagram schematically showing a first variation of the hybrid vehicle according to the first embodiment.
Figure 4:
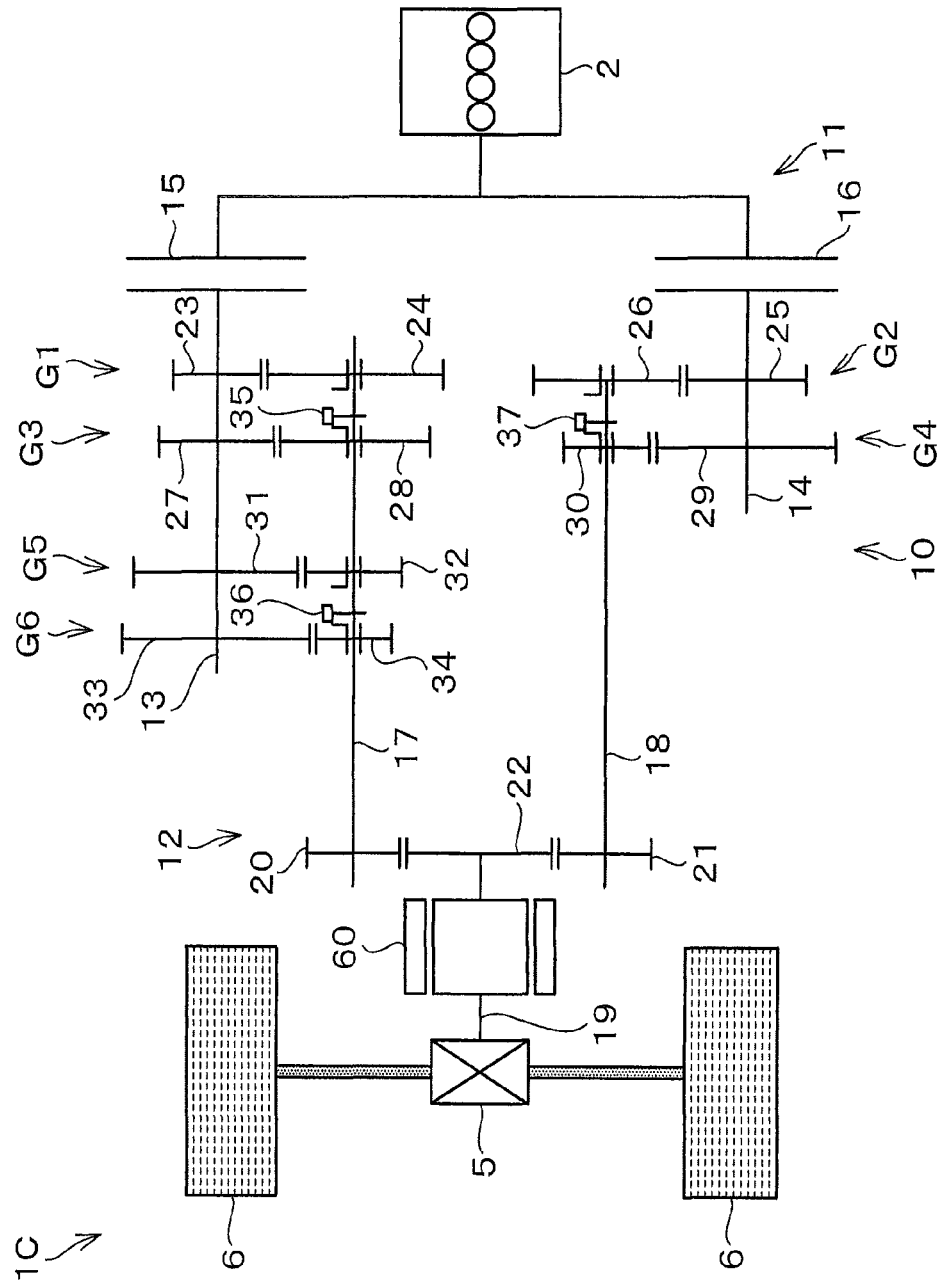
FIG. 4 is a diagram schematically showing a second variation of the hybrid vehicle according to the first embodiment.

Next, referring to FIG. 3 and FIG. 4, a variation of the vehicle of the first embodiment will be described. In FIGS. 3 and 4, signs shared with FIG. 1 denote portions shared with FIG. 1 respectively, and the explanations of the shared portions will be omitted. As with the vehicle 1A in FIG. 1, the vehicle shown in FIGS. 3 and 4 also has a control system such as the vehicle control device 50. However, the illustration of such a control system is omitted in FIGS. 3 and 4.

FIG. 3 shows a first variation of the vehicle according to the first embodiment. In comparison with the vehicle 1A in FIG. 1, a vehicle 1B shown in this figure does not have the first MG 3, the first driven gear 38, and the first drive gear 39. The vehicle 1B is the same in the other portions as the vehicle 1A. Accordingly, also with respect to the vehicle 1B, just by providing three sleeves 35 to 37 and the drive actuators for driving the sleeves 35 to 37 respectively to the transmission 10, it is possible to execute the gear change between speed stages from the first speed stage to the sixth speed stage. Thereby, it is possible to reduce the vehicle cost. Also in the vehicle 1B, the vehicle control device 50 implements the transmission control routine shown in FIG. 2 to control the transmission 10. Thereby, it is possible to suppress the gear change shock.

FIG. 4 shows a second variation of the vehicle according to the first embodiment. In comparison with the vehicle 1A in FIG. 1, a vehicle 1C shown in this figure does not have the first MG 3, the second MG 4, the first driven gear 38, the drive gear 39, the second driven gear 40, and the second drive gear 41. Instead, the drive shaft 19 is provided with a motor generator 60. The motor generator 60 is, as with the first MG 3 and the second MG 4, a well-known motor generator which functions as an electric motor and also an electric generator.

In the vehicle 1C, the drive shaft 19 is driven with the motor generator 60 so that the drive wheels 6 are driven. Also with respect to the vehicle 1C, just by providing three sleeves 35 to 37 and the drive actuators for driving the sleeves 35 to 37 respectively to the transmission 10, it is possible to execute the gear change between speed stages from the first speed stage to the sixth speed stage. Accordingly, it is possible to reduce the vehicle cost. In this vehicle 1C, the motor generator 60 assists the drive wheels 6 to be driven at both gear changes from the fifth to the sixth speed stage and from the sixth to the fifth speed stage. Thereby it is possible to suppress a sudden change of the vehicle speed. Further, when such an assist with the motor generator 60 is impossible at either one of the above gear changes, the gear change is banned. Thereby, it is possible to suppress a sudden change of the vehicle speed. Therefore, it is possible to suppress the gear change shock.

In this first embodiment, the sixth speed stage corresponds to the specific even-numbered stage of the present invention, and the fifth speed stage corresponds to the specific odd-numbered stage of the present invention. The first sleeve 35, the second sleeve 36, and the third sleeve 37 correspond to the connecting mechanisms of the present invention. The vehicle control device 50 functions as a control device of the present invention by implementing step S17 in FIG. 2, and functions as a gear change banning device of the present invention by implementing steps S15 and S16 in FIG. 2. The fifth gear train G5 and the sixth gear train G6 correspond to the gear train group of the present invention.

Second Embodiment

Figure 5:
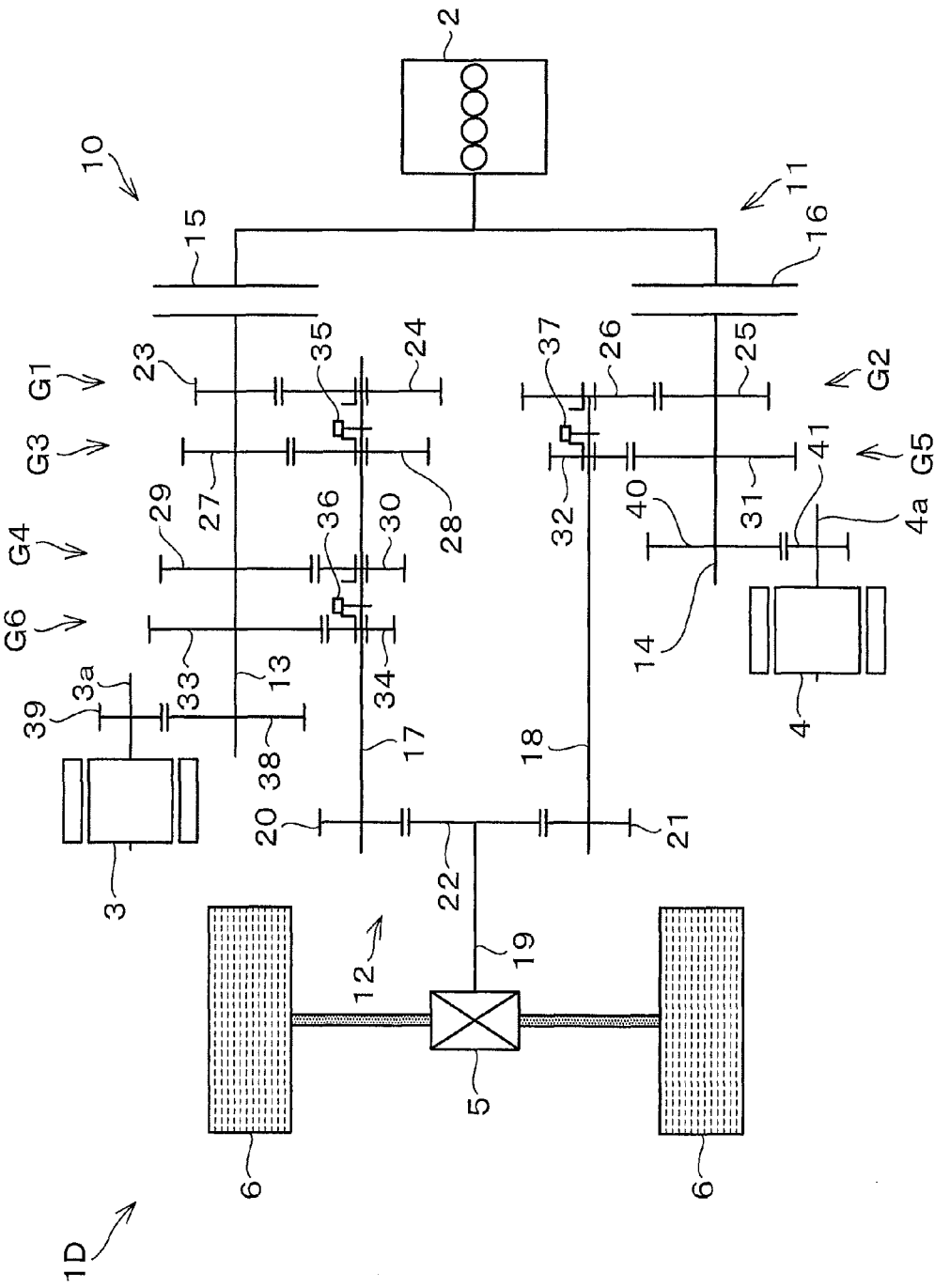
FIG. 5 is a diagram schematically showing a hybrid vehicle according to a second embodiment of the preset invention.

Referring to FIG. 5, a vehicle 1D according to a second embodiment of the present invention will be described. In FIG. 5, signs shared with FIG. 1 denote portions shared with FIG. 1 respectively, and the explanation of such portions will be omitted. Although the vehicle 1D shown in this figure also has, as with the vehicle 1A in FIG. 1, a control system such as the vehicle control device 50, the control system is not illustrated. As shown in this figure, in the vehicle 1D, the first gear train G1, the third gear train G3, the fourth gear train G4, and the sixth gear train G6 intervene between the first input shaft 13 and the first output shaft 17. And, the second gear train G2 and the fifth gear train G5 intervene between the second input shaft 14 and the second output shaft 18. That is, in the present embodiment, in comparison with the vehicle 1A in the first embodiment, the fourth gear train G4 and the fifth gear train G5 are arranged to replace each other. With respect to the other portions, this second embodiment is the same as the first embodiment.

In the vehicle 1D, the fourth drive gear 29 is fixed to the first input shaft 13 so as to rotate integrally with the first input shaft 13. The fourth driven gear 30 is supported on the first output shaft 17 so as to rotate relatively with respect to the first output shaft 17. the fifth drive gear 31 is fixed to the second input shaft 14 so as to rotate integrally with the second input shaft 14. The fifth driven gear 32 is supported on the second output shaft 18 so as to rotate relatively with respect to the second output shaft 18.

In this vehicle 1D, the second sleeve 36 is provided between the fourth gear train G4 and the sixth gear train G6 which are arranged next to each other. The second sleeve 36 is provided so as to change its position between a fourth speed position where the second sleeve 36 is engaged with the fourth driven gear 30 so that the fourth driven gear 30 rotates integrally with the first output shaft 17, a sixth speed position where the second sleeve 36 is engaged with the sixth driven gear 34 so that the sixth driven gear 34 rotates integrally with the first output shaft 17, and a released position where the second sleeve 36 is engaged with neither the fourth driven gear 30 nor the sixth driven gear 34. The third sleeve 37 is provided between the second gear train G2 and the fifth gear train G5 which are arranged next to each other. The third sleeve 37 is provided so as to change its position between a second speed position where the third sleeve 37 is engaged with the second driven gear 26 so that the second driven gear 26 rotates integrally with the second output shaft 18, a fifth speed position where the third sleeve 37 is engaged with the fifth driven gear 32 so that the fifth driven gear 32 rotates integrally with the second output shaft 18, and a released position where the third sleeve 37 is engaged with neither the second driven gear 26 nor the fifth driven gear 32.

In the vehicle 1D, when the position of the second sleeve 36 has been changed to the fourth speed position and the positions of the first sleeve 35 and the third sleeve 37 have been changed to the released positions respectively, the speed stage of the transmission 10 is a fourth speed stage. When the position of the third sleeve 37 has been changed to the fifth speed position, and the positions of the first sleeve 35 and the second sleeve 36 have been changed to the released positions respectively, the speed stage of the transmission 10 is a fifth speed stage. With respect to the first speed stage to the third speed stage, and the sixth speed stage, the positions of the sleeves 35 to 37 are the same as those in the first embodiment. Due to this, the explanation thereof will be omitted.

According to the vehicle 1D of the present embodiment, four sets of gear trains are arranged between the first input shaft 13 and the first output shaft 17, and two sets of gear trains are arranged between the second input shaft 14 and the second output shaft 18. Due to this, just by providing three sleeves 35 to 37 and the drive actuators for driving the sleeves 35 to 37 respectively to the transmission 10, it is possible to execute the gear change between speed stages from the first speed stage to the sixth speed stage. Therefore, it is possible to reduce the vehicle cost.

In the vehicle 1D, it is possible to suppress the gear change shock by making the second MG 4 assist the drive wheels 6 to be driven when the gear changes from the third to the fourth speed stage and from the fourth to the third speed stage are executed. Further, it is possible to further suppress the gear change shock by banning the gear change, when the assist using the second MG 4 is impossible at the above mentioned gear changes.

In this second embodiment, the fourth speed stage corresponds to the specific even-numbered stage, the third speed stage corresponds to the specific odd-numbered stage. The third gear train G3 and the fourth gear train G4 correspond to the gear train group.

Third Embodiment

Figure 6:
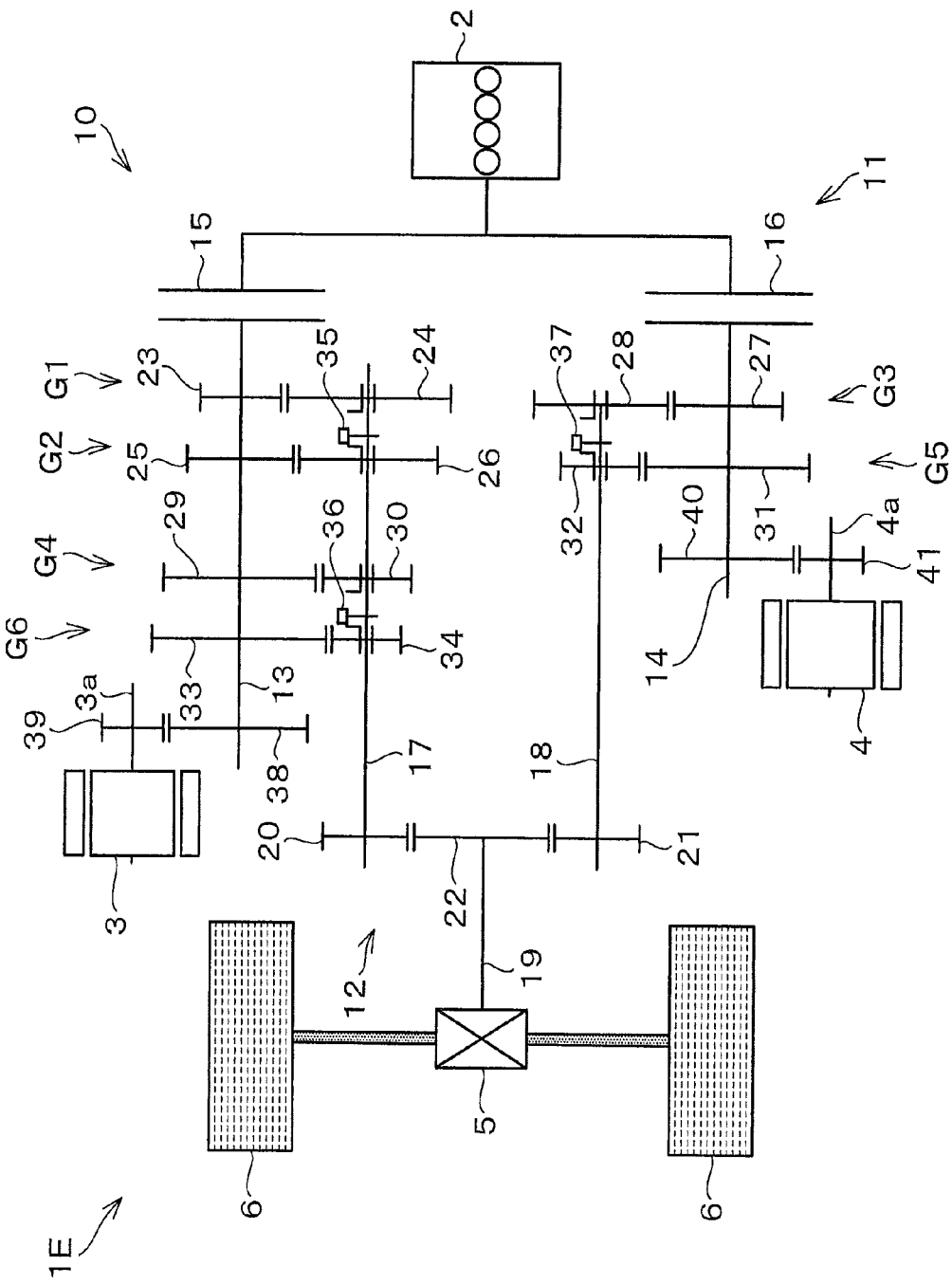
FIG. 6 is a diagram schematically showing a hybrid vehicle according to a third embodiment of the preset invention.

Referring to FIG. 6, a vehicle 1E according to a third embodiment of the present invention will be described. In FIG. 6, signs shared with FIG. 1 denote portions shared with FIG. 1 respectively, and the explanation of such portions will be omitted. Although the vehicle 1E shown in this figure also has, as with the vehicle 1A in FIG. 1, a control system such as the vehicle control device 50, the control system is not illustrated. As shown in this figure, in the vehicle 1E, the first gear train G1, the second gear train G2, the fourth gear train G4, and the sixth gear train G6 intervene between the first input shaft 13 and the first output shaft 17. And, the third gear train G3 and the fifth gear train G5 intervene between the second input shaft 14 and the second output shaft 18. That is, in the present embodiment, in comparison with the vehicle 1A in the first embodiment, the second gear train G2 and the third gear train G3 are arranged to replace each other, and also the fourth gear train G4 and the fifth gear train G5 are arranged to replace each other. With respect to the other portions, this third embodiment is the same as the first embodiment.

In the vehicle 1E, the second drive gear 24 and the fourth drive gear 29 are fixed to the first input shaft 13 so as to rotate integrally with the first input shaft 13. The second driven gear 26 and the fourth driven gear 30 are supported on the first output shaft 17 so as to rotate relatively with respect to the first output shaft 17. The third drive gear 27 and the fifth drive gear 31 are fixed to the second input shaft 14 so as to rotate integrally with the second input shaft 14. The third driven gear 28 and the fifth driven gear 32 are supported on the second output shaft 18 so as to rotate relatively with respect to the second output shaft 18.

In the vehicle 1E, the first sleeve 35 is provided between the first gear train G1 and the second gear train G2 which are arranged next to each other. The first sleeve 35 is provided so as to change its position between a first speed position where the first sleeve 35 is engaged with the first driven gear 24 so that the first driven gear 24 rotates integrally with the first output shaft 17, a second speed position where the first sleeve 35 is engaged with the second driven gear 26 so that the second driven gear 26 rotates integrally with the first output shaft 17, and a released position where the first sleeve 35 is engaged with neither the first driven gear 24 nor the second driven gear 26. The second sleeve 36 is provided between the fourth gear train G4 and the sixth gear train G6 which are arranged next to each other. The second sleeve 36 is provided so as to change its position between a fourth speed position where the second sleeve 36 is engaged with the fourth driven gear 30 so that the fourth driven gear 30 rotates integrally with the first output shaft 17, a sixth speed position where the second sleeve 36 is engaged with the sixth driven gear 34 so that the sixth driven gear 34 rotates integrally with the first output shaft 17, and a released position where the second sleeve 36 is engaged with neither the fourth driven gear 30 nor the sixth driven gear 34. The third sleeve 37 is provided between the third gear train G3 and the fifth gear train G5 which are arranged next to each other. The third sleeve 37 is provided so as to change its position between a third speed position where the third sleeve 37 is engaged with the third driven gear 28 so that the third driven gear 28 rotates integrally with the second output shaft 18, a fifth speed position where the third sleeve 37 is engaged with the fifth driven gear 32 so that the fifth driven gear 32 rotates integrally with the second output shaft 18, and a released position where the third sleeve 37 is engaged with neither the third driven gear 28 nor the fifth driven gear 32.

In the vehicle 1E, the speed stage of the transmission 10 is the second speed stage, when the position of the first sleeve 35 has been changed to the second speed position and the positions of the second sleeve 36 and the third sleeve 37 are the released positions respectively. The speed stage of the transmission 10 is the third speed stage, when the position of the third sleeve 37 has been changed to the third speed position and the positions of the first sleeve 35 and the second sleeve 36 have been changed to the released positions respectively. The speed stage of the transmission 10 is the fourth speed stage, when the position of the second sleeve 36 has been changed to the fourth speed position and the positions of the first sleeve 35 and the third sleeve 37 have been changed to the released positions respectively. The speed stage of the transmission 10 is the fifth speed stage, when the position of the third sleeve 37 has been changed to the fifth speed position and the positions of the first sleeve 35 and the second sleeve 36 have been changed to positions respectively. With respect to the first speed stage and the sixth speed stage, the positions of the sleeves 35 to 37 are the same as those in the first embodiment. Due to this, the explanation thereof will be omitted.

According to the vehicle 1E of the present embodiment, four sets of gear trains are arranged between the first input shaft 13 and the first output shaft 17, and two sets of gear trains are arranged between the second input shaft 14 and the second output shaft 18. Due to this, just by providing three sleeves 35 to 37 and the drive actuators for driving the sleeves 35 to 37 respectively to the transmission 10, it is possible to execute the gear change between speed stages from the first speed stage to the sixth speed stage. Therefore, it is possible to reduce the vehicle cost.

In the vehicle 1E, it is possible to suppress the gear change shock, by making the second MG 4 assist the drive wheels 6 to be driven when the gear changes from the first to the second speed stage and from the second to the first speed stage are executed. Further, it is possible to further suppress the gear change shock, by banning the gear change, when the assist using the second MG 4 is impossible at the above mentioned gear changes.

In the third embodiment, the second speed stage corresponds to the specific even-numbered stage, the first speed stage corresponds to the specific odd-numbered stage. The first gear train G1 and the second gear train G2 correspond to the gear train group.

Fourth Embodiment

Figure 7:
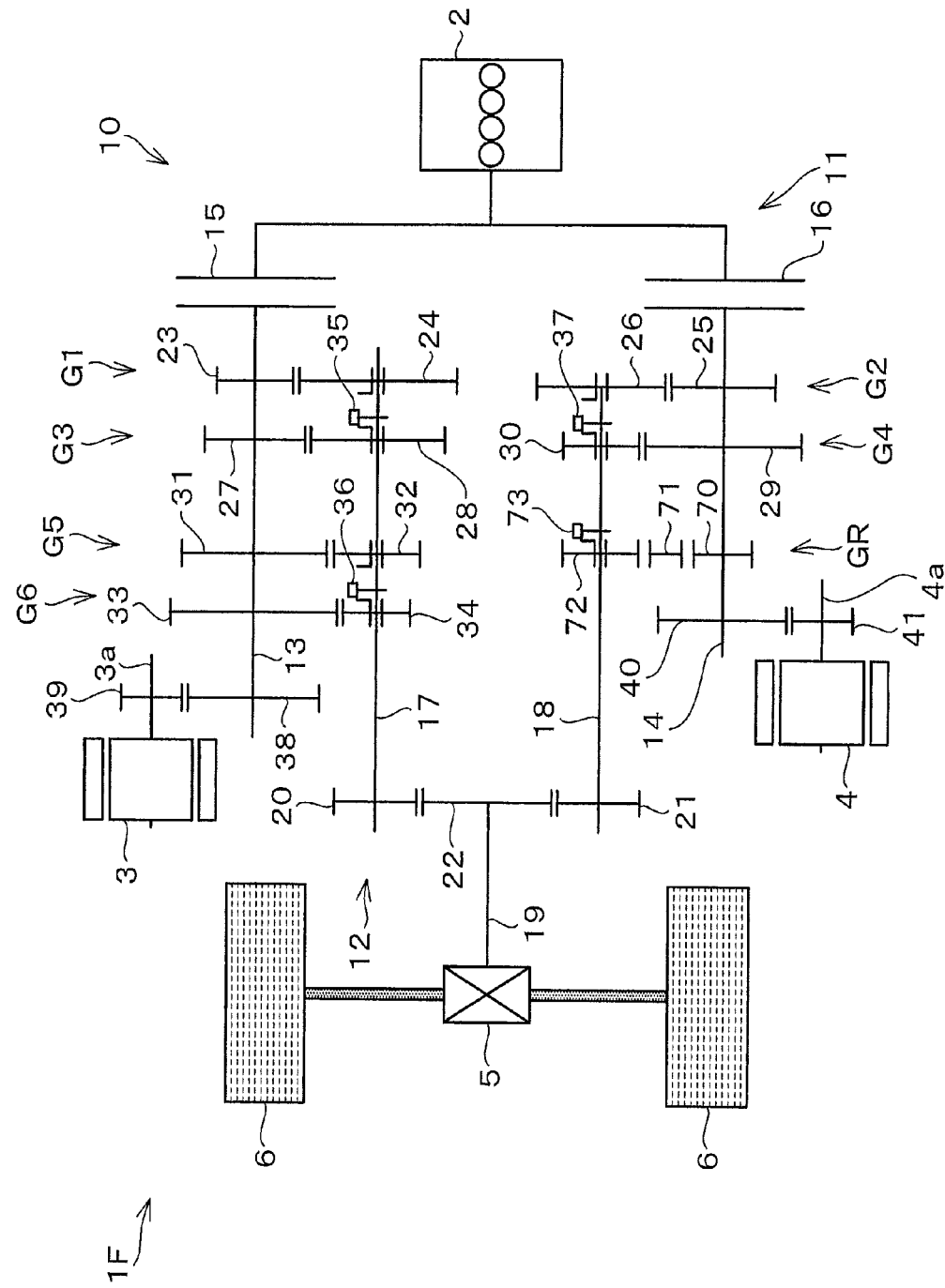
FIG. 7 is a diagram schematically showing a hybrid vehicle according to a fourth embodiment of the preset invention.

Referring to FIG.7, a vehicle 1F according to a fourth embodiment of the present invention will be described. In FIG.7, signs shared with FIG.1 denote portions shared with FIG.1 respectively, and the explanation of such portions will be omitted. Although the vehicle 1F shown in this figure also has, as with the vehicle 1A in FIG.1, a control system such as the vehicle control device 50, the control system is not illustrated. As shown in this figure, the vehicle 1F is different from the first embodiment in a point that a reverse gear train GR is provided between the second input shaft 14 and the second output shaft 18.

The reverse gear train GR comprises a reverse drive gear 70, an intermediate gear 71, and a reverse driven gear 72. The reverse drive gear 70 is fixed to the second input shaft 14 so as to rotate integrally with the second input shaft 14. On the other hand, the reverse driven gear 72 is supported on the second output shaft 18 so as to rotate relatively with respect to the second output shaft 18. The intermediate gear 71 is supported in a not-illustrated case of the transmission 10 in a freely rotatable manner. The intermediate gear 71 is engaged with each of the reverse drive gear 70 and the reverse driven gear 72. A fourth sleeve 73 is provided to the second output shaft 18. The fourth sleeve 73 is supported on the second output shaft 18 so as to be allowed to rotate integrally with the second output shaft 18 and also to move in an axis line direction of the second output shaft 18. The fourth sleeve 73 is provided so as to change its position between a reverse position where the fourth sleeve 73 is engaged with the reverse driven gear 72 so that the reverse driven gear 72 rotates integrally with the second output shaft 18 and a released position where the fourth sleeve 73 is not engaged with the reverse driven gear 72.

In the vehicle 1F, the vehicle 1F is made to reverse with the engine 2, when the position of the fourth sleeve 72 has been changed to the reverse position and also all of the positions of the first to third sleeves 35 to 37 have been changed to the released positions.

Since the reverse gear train GR is arranged on the input shaft having a low number of transmission gear trains, it is possible to make the vehicle 1F compact in comparison with a case that the reverse gear train GR is arranged on the input shaft having a high number of transmission gear trains.

In the fourth embodiment, the sixth speed stage corresponds to the specific even-numbered stage of the present invention, and the fifth speed stage corresponds to the specific odd-numbered stage of the present invention.

The vehicle of the present invention is not limited to the vehicle shown in each of the above embodiments. It is enough that the vehicle of the present invention comes with the transmission which satisfies the following conditions. The transmission of the present invention has 4n+2 sets of forward gear trains (n is an integer equal to one or more). That is, the transmission of the present invention is a dual clutch transmission providing such as forward 6 speed stages, forward 10 speed stages, forward 14 speed stages. Further, one speed stage of even-numbered stages (a specific even-numbered stage) and an odd-numbered stage (a specific odd-numbered stage), which is either one stage lower or one stage higher than the specific even-numbered stage, are arranged between a shared input shaft and a shared output shaft. Then, both of the number of gear trains which are arranged between the first input shaft 13 and the first output shaft 17 and the number of gear trains which are arranged between the second input shaft 14 and the second output shaft 18 are even-number. If such a dual clutch transmission is employed, it is not necessary to provide the sleeve and the drive actuator for driving the sleeve for one set of gear train. Due to this, it is possible to reduce the cost.

The present invention is not limited to the above embodiments and may be executed in various kinds of embodiments. For example, the above embodiments, the input shaft and the motor generator are connected with each other in a power transmittable manner via the gears. However, the output shaft of the motor generator may be connected directly to the input shaft.

Fifth Embodiment

Figure 8:
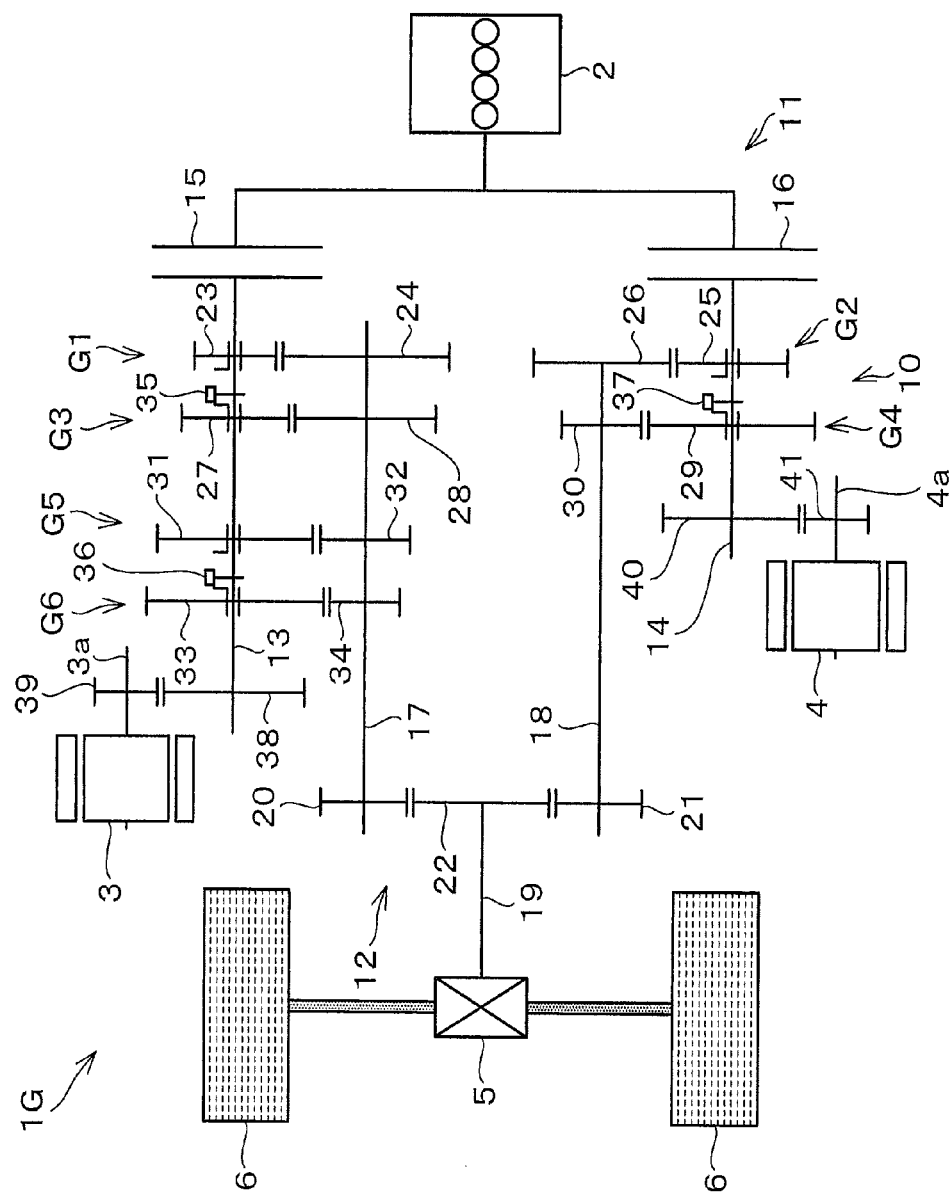
FIG. 8 is a diagram schematically showing a hybrid vehicle according to a fifth embodiment of the preset invention.

Referring to FIG. 8, a hybrid vehicle according to a fifth embodiment of the present invention will be described. In this figure, signs shared with the above embodiments denote portions shared with the above embodiments respectively, and the explanation of such portions will be omitted. Although a vehicle 1G shown in this figure also has, as with the vehicle 1A in FIG. 1, a control system such as the vehicle control device 50, the control system is not illustrated. In the vehicle 1G, the first drive gear 23, the third drive gear 27, the fifth drive gear 31, and the sixth drive gear 33 are supported to the first input shaft 13 so as to rotate relatively with respect to the first input shaft 13. On the other hand, the first driven gear 24, the third driven gear 28, the fifth driven gear 32, and the sixth driven gear 34 are fixed to the first output shaft 17 so as to rotate integrally with the first output shaft 17. The second drive gear 25 and the fourth drive gear 29 are supported on the second input shaft 14 so as to rotate relatively with respect to the second input shaft 14. On the other hand, the second driven gear 26 and the fourth driven gear 30 are fixed to the second output shaft 18 so as to rotate integrally with the second output shaft 18.

As shown in this figure, in the vehicle 1G, the first sleeve 35 and the second sleeve 36 are provided to the first input shaft 13. The third sleeve 37 is provided to the second input shaft 14. The others are the same as those in the first embodiment. In this way, in the hybrid vehicle of the present invention, the sleeves 35 to 37 may be provided to the input shafts 13 and 14. Also in the present embodiment, as with the above embodiments, it is possible to reduce the number of sleeves and the number of drive actuators for driving the sleeves. Thereby, it is possible to reduce the vehicle cost.

Sixth Embodiment

Figure 9:
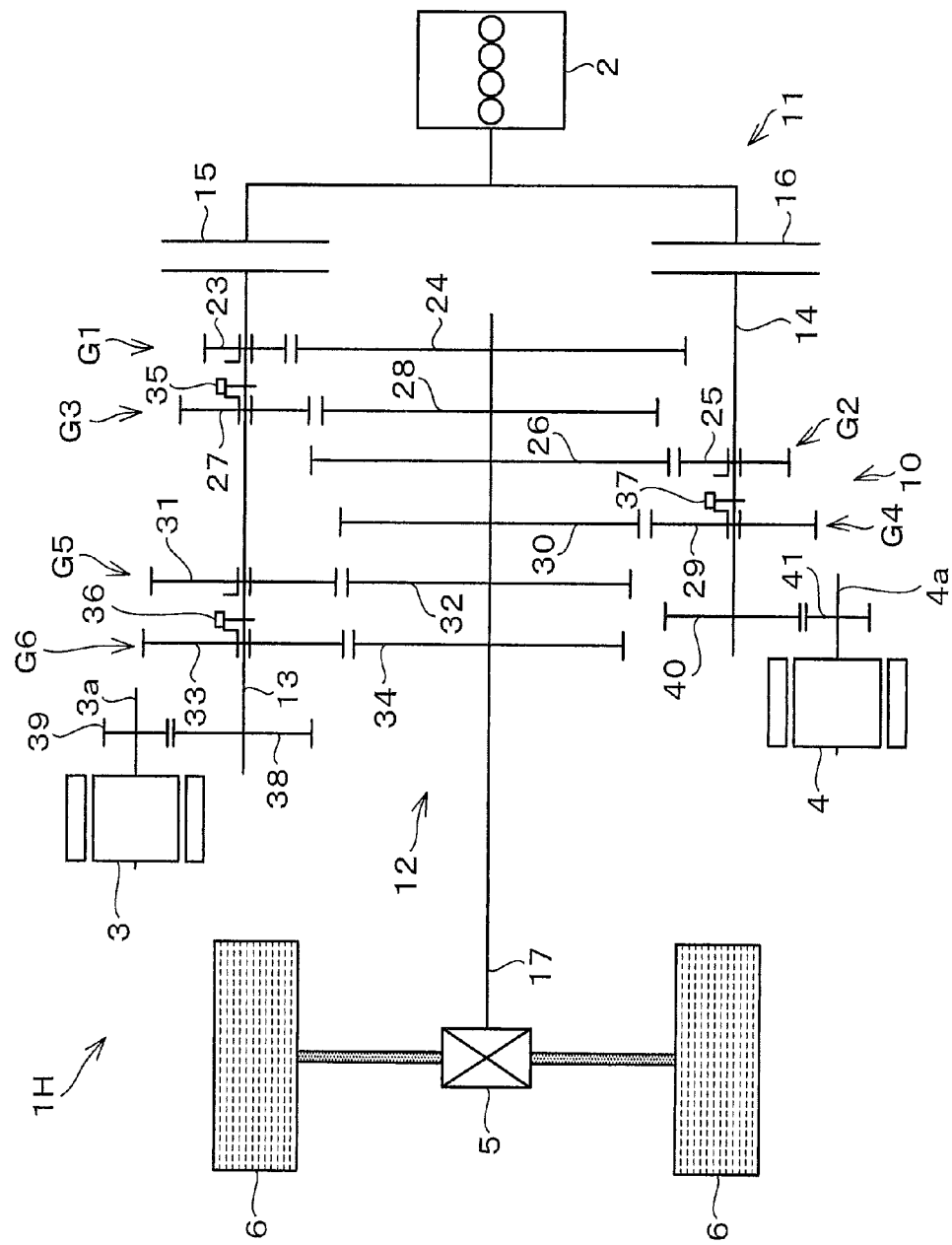
FIG. 9 is a diagram schematically showing a hybrid vehicle according to a sixth embodiment of the preset invention.

Referring to FIG. 9, the hybrid vehicle according to the sixth embodiment of the present invention will be described. In this figure, signs shared with the above embodiments denote portions shared with the above embodiments respectively, and the explanation of such portions will be omitted. Although a vehicle 1H shown in this figure also has, as with the vehicle 1A in FIG. 1, a control system such as the vehicle control device 50, the control system is not illustrated. As shown in FIG. 9, in the present embodiment, the second output shaft 18 is removed. The first driven gear 24, the second driven gear 26, the third driven gear 28, the fourth driven gear 30, the fifth driven gear 32, and the sixth driven gear 34 are fixed to the first output shaft 17. The first output shaft 17 is connected to the differential mechanism 5 in a power transmittable manner. Also in the present embodiment, as with the above mentioned embodiments, it is possible to reduce the number of sleeves and the number of drive actuators for driving the sleeves. Thereby, it is possible to reduce the vehicle cost. In the vehicle 1H, the sleeves 35 to 37 may be provided to the first output shaft 17.

Figure 10:
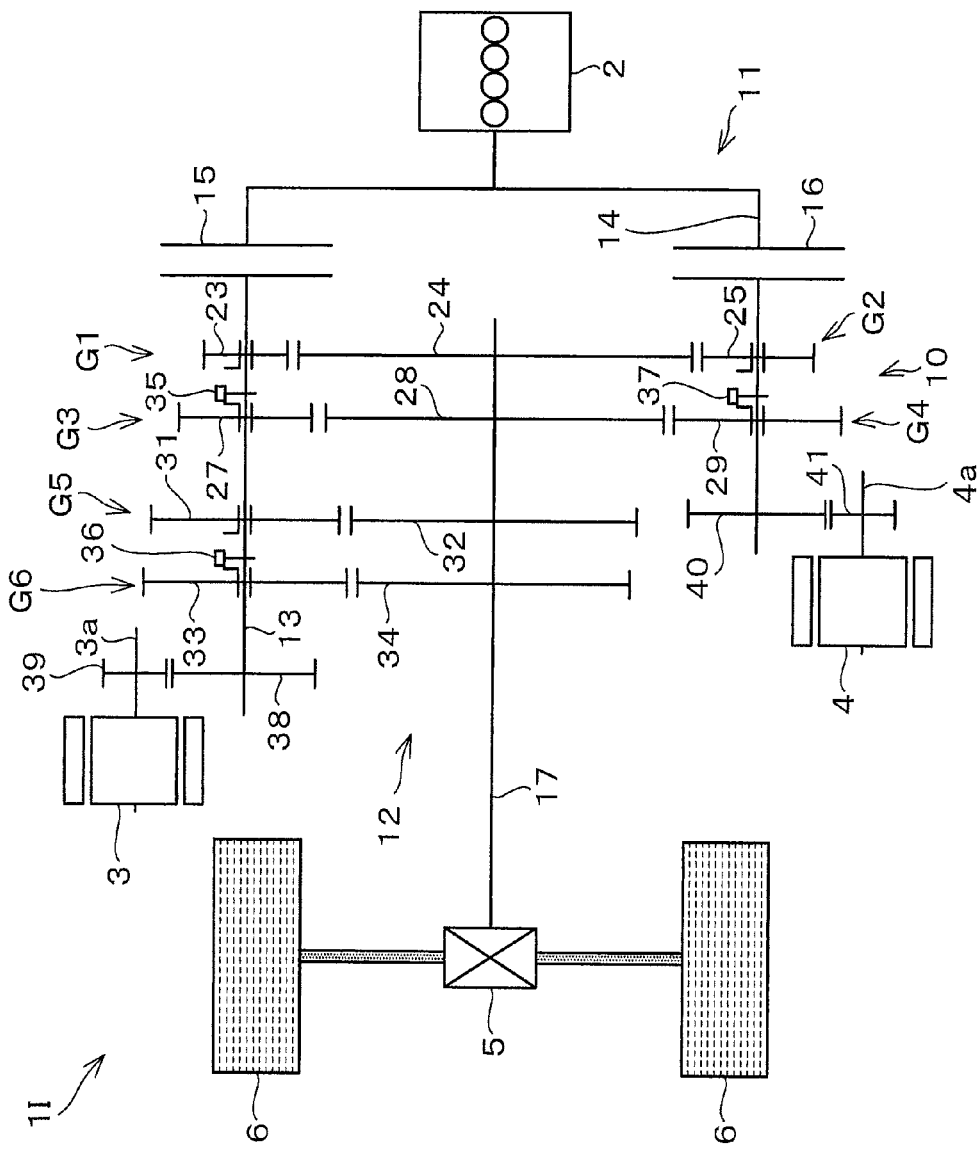
FIG. 10 is a diagram schematically showing a variation of the hybrid vehicle according to the sixth embodiment.

FIG. 10 shows a variation of a vehicle according to the sixth embodiments. In a vehicle 1I of the present variation, the second drive gear 25 is made to engage with the first driven gear 24, and the fourth drive gear 29 is made to engage with the third driven gear 28. The second drive gear 25 and the first driven gear 24 constitute the second gear train G2. And, the fourth drive gear 29 and the third driven gear 28 constitute the fourth drive gear train G4. The gear ratio of the second drive gear 25 and the first driven gear 24 is set to be the same as the gear ratio of the second drive gear 25 and the second driven gear 26 in the above mentioned embodiments. The gear ratio of the fourth drive gear 29 and the third driven gear 28 is set to be the same as the gear ratio of the fourth drive gear 29 and the fourth driven gear 30 in the above mentioned embodiments. In the present embodiment, it is possible to further reduce the vehicle cost, because it is possible to reduce the number of gears to be provided to the first output shaft 17.

Seventh Embodiment

Figure 11:
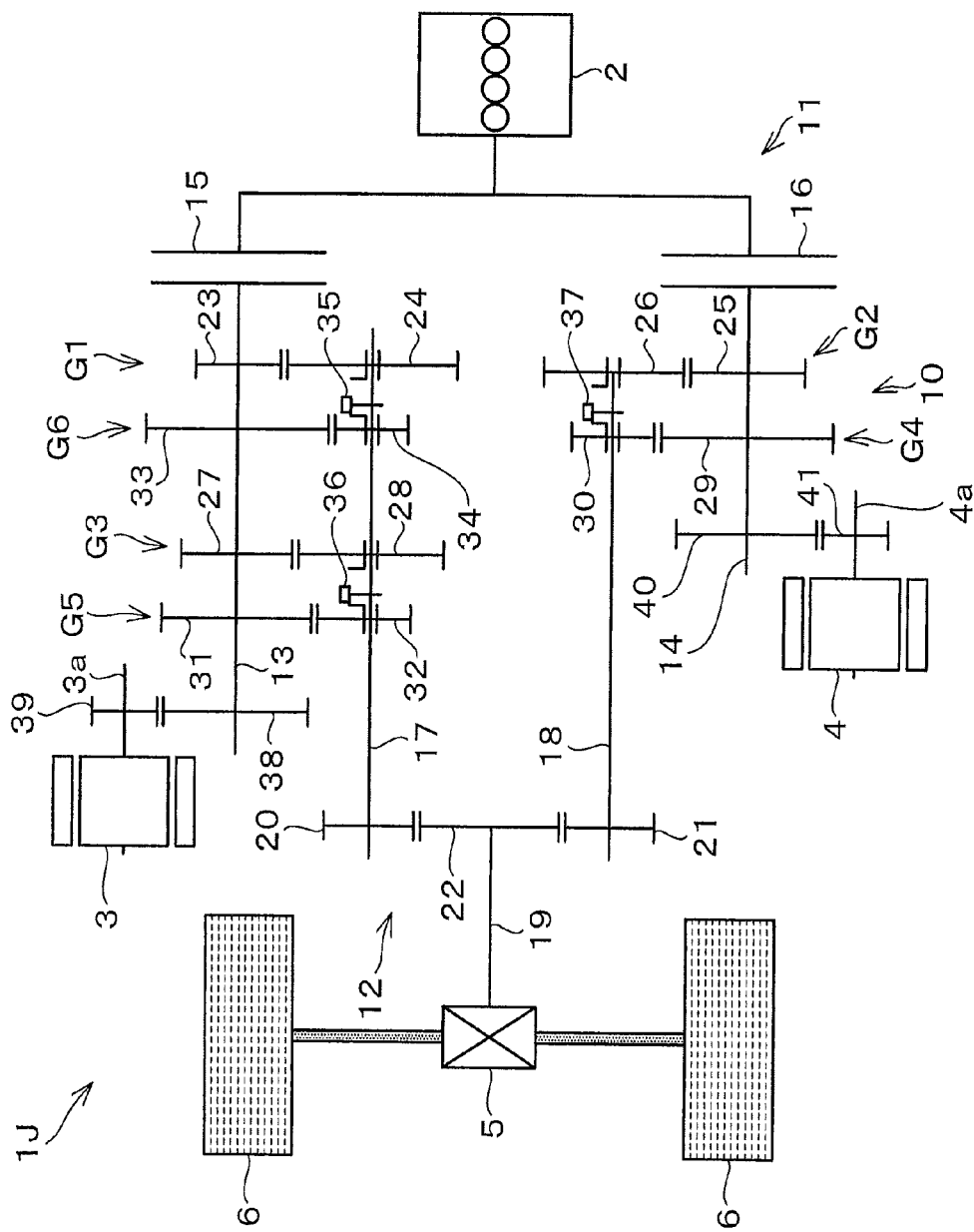
FIG. 11 is a diagram schematically showing a hybrid vehicle according to a seventh embodiment of the preset invention.

Referring to FIG. 11, a hybrid vehicle according to a seventh embodiment of the present invention will be described. In this figure, signs shared with the above embodiments denote portions shared with the above embodiments respectively, and the explanation of such portions will be omitted. Although a vehicle 1J shown in this figure also has, as with the vehicle 1A in FIG. 1, a control system such as the vehicle control device 50, the control system is not illustrated. As shown in FIG. 11, in the present embodiment, the first gear train G1, the sixth gear train G6, the third gear train G3, and the fifth gear train G5 are arranged in this order from the engine side, between the first input shaft 13 and the first output shaft 17.

In the present embodiment, the first sleeve 35 is provided between the first gear train G1 and the sixth gear train G6. The first sleeve 35 is provided so as to change its position between a first speed position where the first sleeve 35 is engaged with the first driven gear 24 so that the first driven gear 24 rotates integrally with the first output shaft 17, a sixth speed position where the first sleeve 35 is engaged with the sixth driven gear 34 so that the sixth driven gear 34 rotates integrally with the first output shaft 17, and a released position where the first sleeve 35 is engaged with neither the first driven gear 24 nor the sixth driven gear 34. Further, in the present invention, the second sleeve 36 is provided between the third gear train G3 and the fifth gear train G5. The second sleeve 36 is provided so as to change its position between a third speed position where the second sleeve 36 is engaged with the third driven gear 28 so that the third driven gear 28 rotates integrally with the first output shaft 17, a fifth speed position where the second sleeve 36 is engaged with the fifth driven gear 32 so that the fifth driven gear 32 rotates integrally with the first output shaft 17, and a released position where the second sleeve 36 is engaged with neither the third driven gear 28 nor the fifth driven gear 32. Also in the present embodiment, as with the above mentioned embodiments, it is possible to reduce the number of sleeves and the number of drive actuators for driving the sleeves. Thereby, it is possible to reduce the vehicle cost. Additionally, also in the vehicle 1J, the sleeves 35 to 37 may be provided to the input shafts 13 and 14.

Eighth Embodiment

Figure 12:
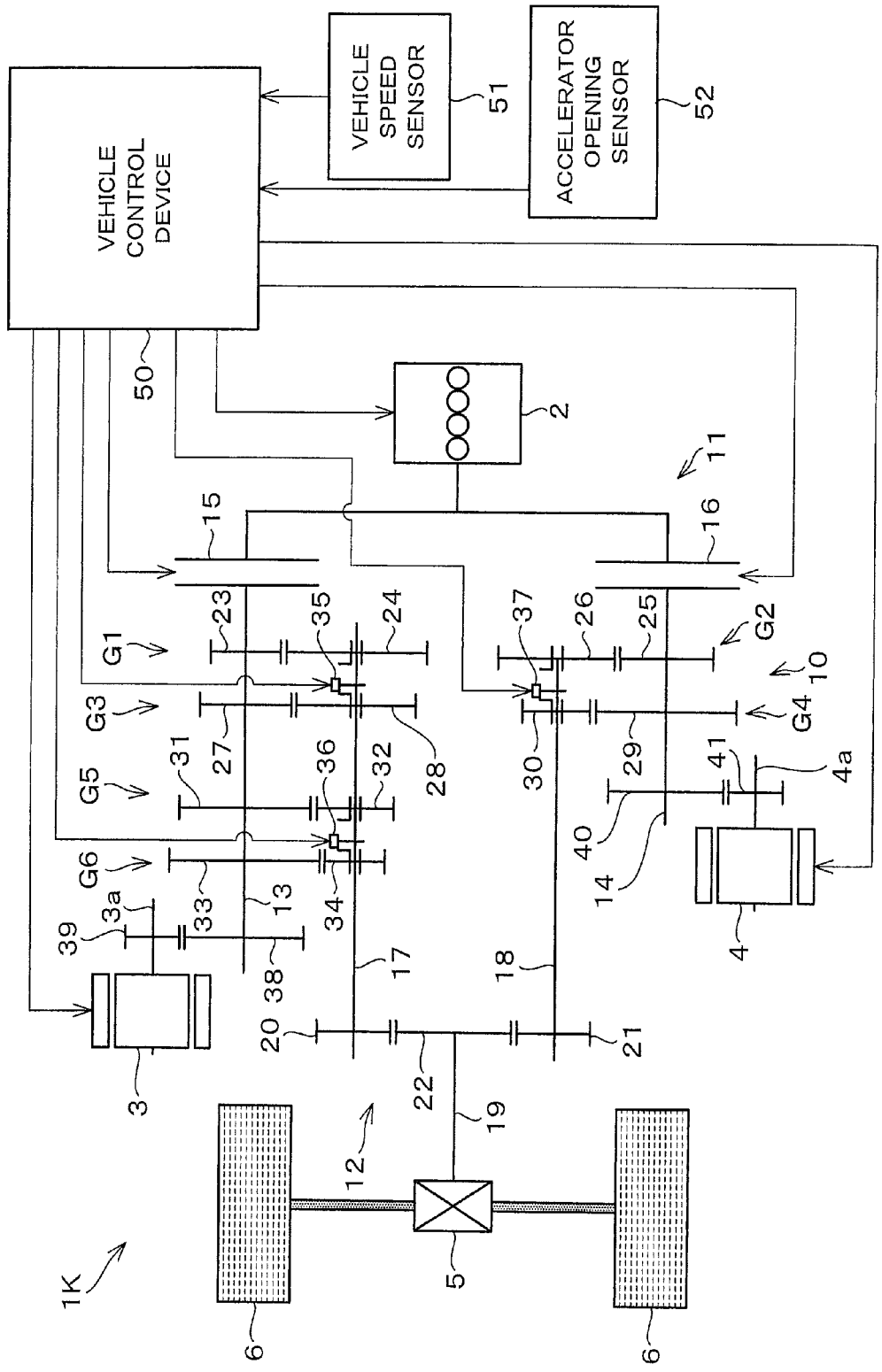
FIG. 12 is a diagram schematically showing a hybrid vehicle according to an eighth embodiment of the preset invention.

Next, referring to Figs.12 to 15, a hybrid vehicle according to an eighth embodiment of the present invention will be described. In this figure, signs shared with the above embodiments denote portions shared with the above embodiments respectively, and the explanation of such portions will be omitted. FIG.12 shows a hybrid vehicle 1K according to the present embodiment. Also in the present embodiment, the vehicle control device 50 switches the traveling mode of the vehicle 1K based on the vehicle speed and the like. When a large required drive power is required to the vehicle 1 K, for example because of the accelerator pedal strongly pressed while the vehicle 1K is traveling, the vehicle control device 50 executes shift-down to change its speed stage from a current speed stage to a speed stage which is one stage lower than the current speed stage. The shift-down is called the kickdown. In the transmission 10, the fifth gear train G5 corresponding to the fifth speed stage and the sixth gear train G6 corresponding to the sixth speed stage intervene between the first input shaft 13 and the first output shaft 17. With respect to the gear train G5 and the gear train G6, the state of connection to the first output shaft 17 is controlled by means of the second sleeve 36 shared by the gear trains G5 and G6. Due to this, it is impossible to connect both of the gear trains G5 and G6 to the first output shaft 17 at the same time. Then, when executing the shift-down from the sixth speed stage to the fifth speed stage, the vehicle control device 50 makes the second MG 4 output power to assist the drive wheels 6 to be driven. However, when the required drive power to the vehicle 1K is larger than the upper limit of the power the second MG 4 is capable of outputting, the vehicle control device 50 executes the shift-down from the sixth speed stage to the fourth speed stage.

Figure 13:
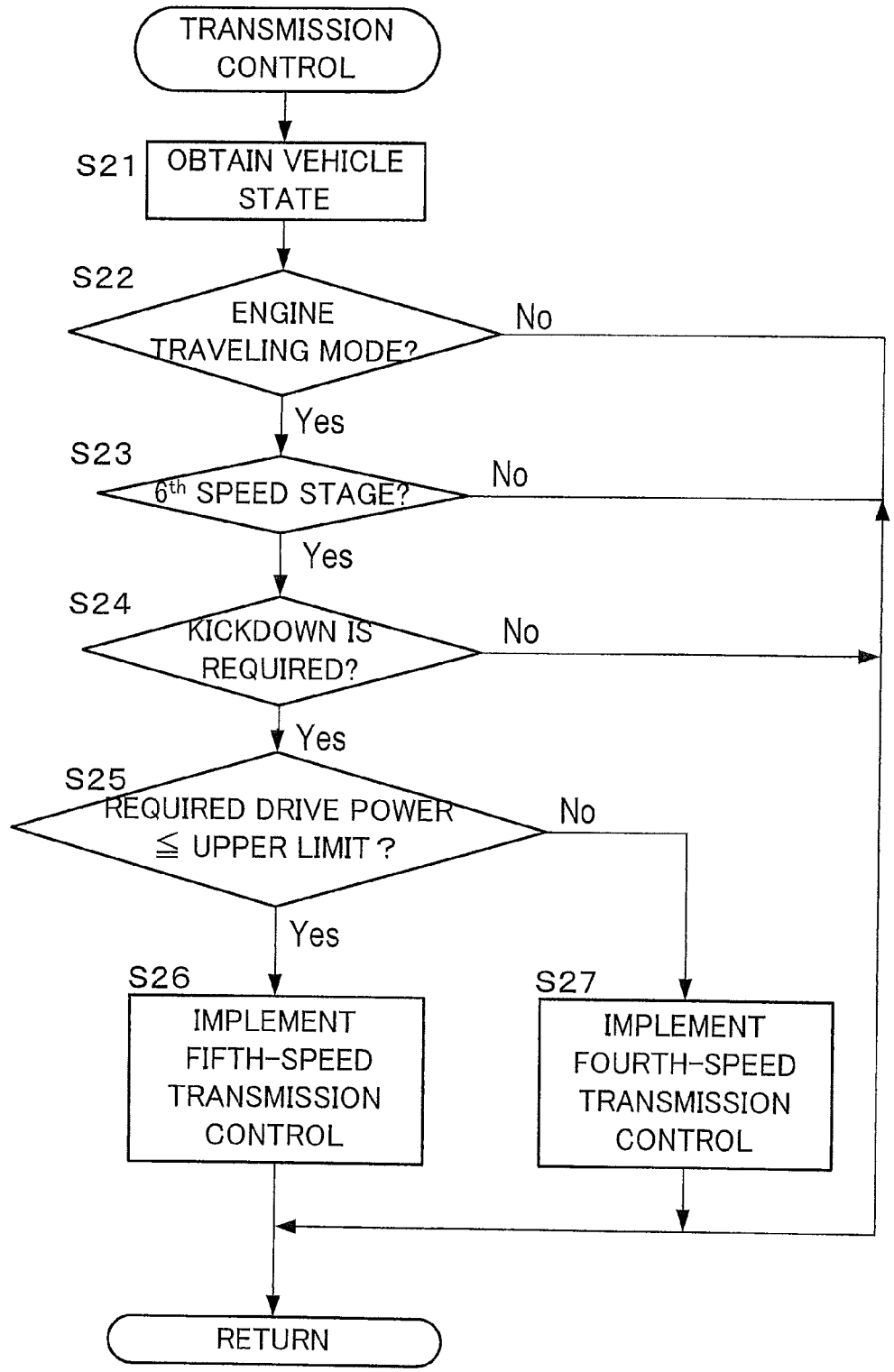
FIG. 13 is a flow chart showing a transmission control routine executed by a vehicle control device of the hybrid vehicle according to the eighth embodiment.

FIG. 13 shows a transmission control routine the vehicle control device 50 implements to control the transmission 10 in the above mentioned way. This control routine is implemented repeatedly at predetermined intervals while the vehicle 1K is traveling.

In the control routine, the vehicle control device 50 first obtains the state of the vehicle 1K at step S21. As the state of the vehicle 1K, obtained are the vehicle speed, the accelerator opening degree, and the current speed stage, for example. At this step, the vehicle control device 50 calculates based on the accelerator opening degree, the drive power required by a driver to the vehicle 1K (the required drive power). Since this calculation method may be a well-known one, the explanation of such a calculation method will be omitted. At this step, in addition to the above mentioned kinds of information, other kinds of information with respect to the state of the vehicle 1K are also obtained.

At the next step S22, the vehicle control device 50 determines whether or not the current traveling mode is the engine traveling mode. When determining that the current traveling mode is not the engine traveling mode, the vehicle control device 50 ends the control routine of the current turn. On the other hand, when determining that the current traveling mode is the engine traveling mode, the vehicle control device 50 goes to step S23 to determine whether or not the speed stage of the transmission 10 is the sixth speed stage. When determining that the speed stage of the transmission 10 is not the sixth speed stage, the vehicle control device 50 ends the control routine of the current turn. On the other hand, when determining that the speed stage of the transmission 10 is the sixth speed stage, the vehicle control device 50 goes to step S24 to determine whether or not the kickdown is being required. As mentioned above, this determination may be made based on the accelerator opening degree and the like using a well-known method. When determining that the kickdown is not being required, the vehicle control device 50 ends the control routine of the current turn.

On the other hand, when determining that the kickdown is being required, the vehicle control device 50 goes to step S25 to determine whether or not the required drive power is a predetermined upper limit or smaller. The upper limit is a value set as a criterion for determining whether or not the second MG 4 is capable of outputting the required drive power. This upper limit may be set, for example, based on the maximum torque of the second MG 4. Alternatively, the upper limit can be set based on the state of charge (SOC) of the battery, the temperatures of: the inverter for controlling the second MG 4; the battery; and the second MG 4, and the like at the moment when the determination is made, for example.

When determining that the required drive power is the upper limit or smaller, the vehicle control device 50 goes to step S26 to implement a fifth-speed transmission control. In the fifth-speed transmission control, the vehicle control device 50 first changes the position of the third sleeve 37 to the fourth speed position, and makes the second MG 4 output the power corresponding to the required drive power. Subsequently, the vehicle control device 50 changes the position of the second sleeve 36 from the sixth speed position to the fifth speed position. After that, the vehicle control device 50 changes the position of the third sleeve 37 to the released position for stopping the power outputted by the second MG 4. Thereby, it is realized that the speed stage of the transmission 10 is changed to the fifth speed stage. After that, the vehicle control device 50 ends the control routine of the current turn.

On the other hand, when determining that the required drive power is larger than the upper limit, the vehicle control device 50 goes to step S27 to implement a fourth-speed transmission control. In the fourth-speed transmission control, the vehicle control device 50 changes the position of the third sleeve 37 to the fourth speed position while changing the state of the second clutch 16 to the half-clutch state. Next, the vehicle control device 50 changes the state of the second clutch 16 to the fully engaged state while changing the state of the first clutch 15 to the released state. After that, the vehicle control device 50 changes the position of the second sleeve 36 to the released position. Thereby, it is realized that the speed stage of the transmission 10 is changed to the fourth speed stage. After that, the vehicle control device 50 ends the control routine of the current turn.

As mentioned above, according to the present invention, in a case that the kickdown is being required in a state that the engine traveling mode is ongoing and also the speed stage of the transmission 10 is the sixth speed stage, if the required drive power is the upper limit or smaller, that is, if the second MG 4 is capable of outputting the required drive power, the vehicle control device 50 changes the speed stage of the transmission 10 to the fifth speed stage while driving the drive wheels 6 by means of the second MG 4. In this case, it is possible to eliminate a period when the drive wheels 6 are not driven, so-called the torque loss occurs, in gear change. Further, it is possible to reduce the fluctuation of the drive power of the vehicle 1K because of the shift-down, by making the second MG 4 output the required drive power in gear change. Thereby, it is possible to suppress the gear change shock.

On the other hand, when the required drive power is larger than the upper limit, that is, when the second MG 4 is incapable of outputting the required drive power, the vehicle control device 50 changes the speed stage of the transmission 10 to the fourth speed stage while moving the state of the second clutch 16 into the half-clutch state. The fourth gear train G4 corresponding to the fourth speed stage intervenes between the second input shaft 14 and the second output shaft 18. Thereby, it is possible to realize the power transmission between the second input shaft 14 and the second output shaft 18 using the fourth gear train G4, while realizing the power transmission between the first input shaft 13 and the first output shaft 17 using the sixth gear train G6. Accordingly, by changing the speed stage of the transmission 10 to the fourth speed stage in this way, it is possible to eliminate the period when the torque loss occurs. Thereby, it is possible to suppress the gear change shock.

Further, according to the present invention, the sixth gear train G6 is provided between the first input shaft 13 and the first output shaft 17. Due to this, just by providing the three sleeves 35 to 37 and the actuators for driving the sleeves 35 to 37, it is possible to execute the gear change between speed stages from the first speed stage to the sixth speed stage. Thereby, it is possible to reduce the cost.

In the above mentioned embodiment, the speed stage after the gear change is changed depending on whether or not the second MG 4 is capable of outputting the required drive power. However, the criterion for determining whether or not the speed stage after the gear change should be changed is not limited to the above case. For example, even if the second MG 4 is incapable of outputting all of the required drive power, the vehicle control device 50 may make the second MG 4 output a part of the required drive power, and because of this, in a case the fluctuation of the drive power of the vehicle 1K can be reduced at the moment of the shift-down, the vehicle control device 50 may execute the gear change from the sixth speed stage to the fifth speed stage. On the other hand, when the fluctuation of the power of the vehicle 1K cannot be reduced even if the power is outputted from the second MG 4, the vehicle control device 50 executes the gear change from the sixth speed stage to the fourth speed stage.

In the above embodiment, the vehicle control device 50 functions as the transmission control device of the present invention by implementing the control routine shown in FIG. 13. The sixth speed stage corresponds to the specific even-numbered stage of the present invention.

Figure 14:
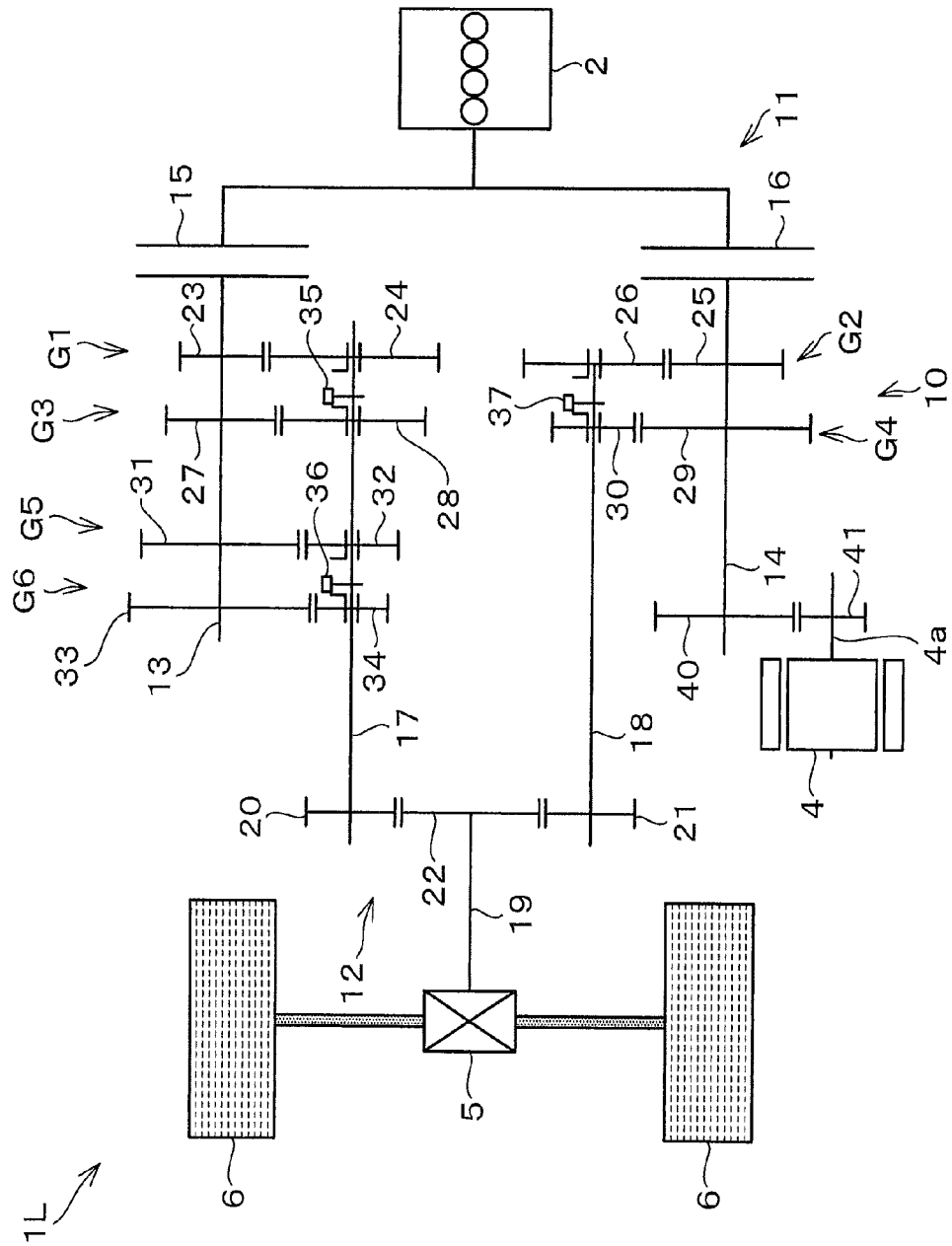
FIG. 14 is a diagram schematically showing a variation of the hybrid vehicle according to the eighth embodiment.

In addition, the vehicle to which the present invention is applied is not limited to the vehicle shown in FIG. 12. It is possible to apply the preset invention to various kinds of vehicles where the drive wheels 6 are allowed to be driven by a motor generator even if the power transmission between the first input shaft 13 and the first output shaft 17 is shut off. For example, the present invention may be applied to a vehicle 1L shown in FIG. 14. In FIG. 14, signs shared with FIG. 12 denote portions shared with FIG. 12 respectively, and the explanation of such portions will be omitted. Further, in FIG. 14, the illustration of the control system is omitted. As shown in this figure, in the vehicle 1L, in comparison with the vehicle 1K shown in FIG. 12, the first MG 3, the first driven gear 38, and the first drive gear 39 are removed. The others are the same as those of the vehicle 1K shown in FIG. 12. Due to this, also with respect to the vehicle 1L, it is possible to control the transmission 10 by implementing the transmission control routine shown in FIG. 13. Then, by implementing this control, it is possible to obtain function effects similar to the above embodiments.

Figure 15:
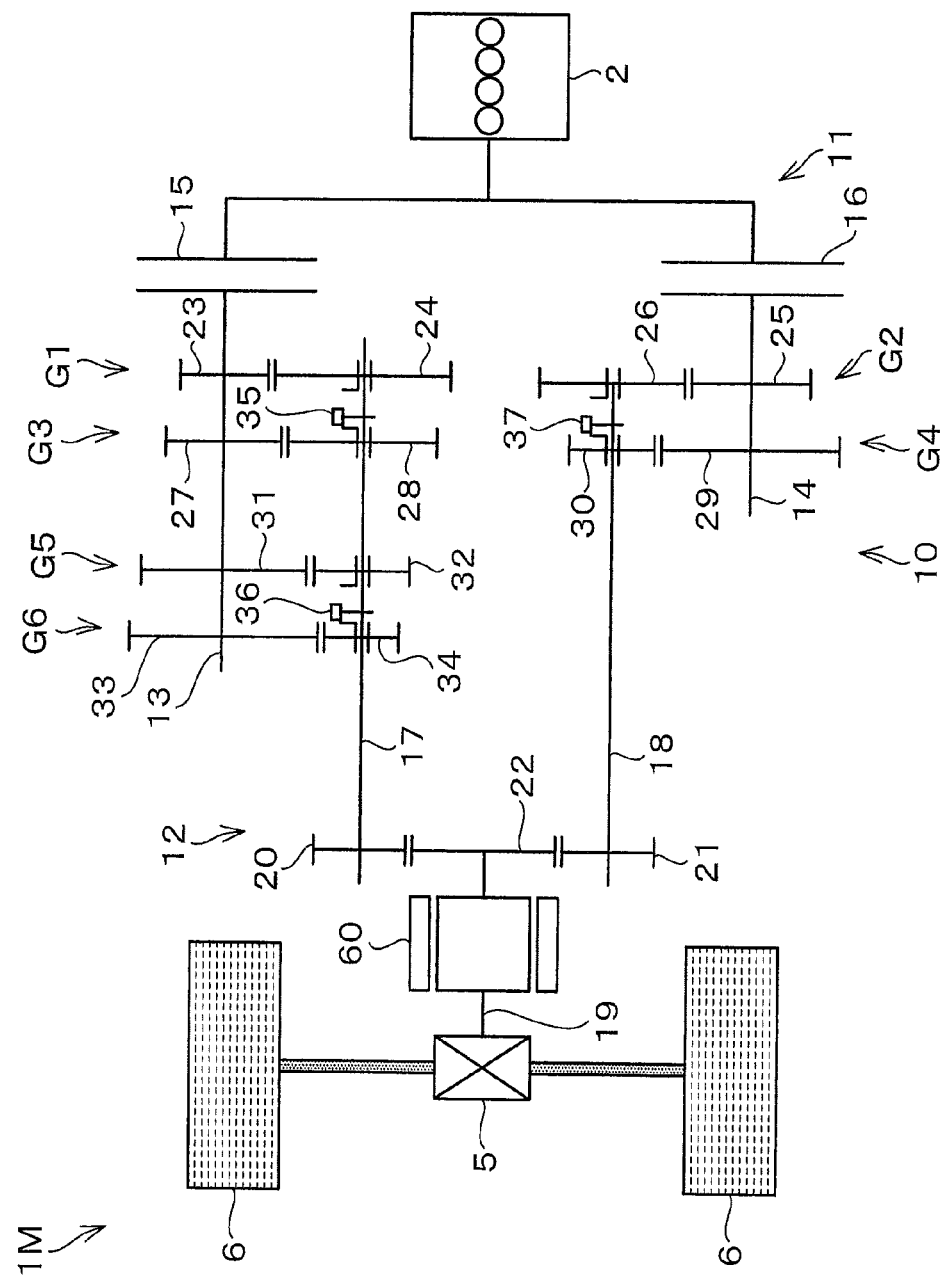
FIG. 15 is a diagram schematically showing another variation of the hybrid vehicle according to the eighth embodiment.

In addition, the present invention may be applied to a vehicle 1M shown in FIG. 15. In FIG. 15, signs shared with FIG. 12 denote portions shared with FIG. 12 respectively, and the explanation of such portions will be omitted. Further, in this figure, the illustration of the control system is omitted. As shown in this figure, in the vehicle 1M, in comparison with the vehicle 1K shown in FIG. 12, the first MG 3, the second MG 4, the first driven gear 38, the first drive gear 39, the second driven gear 40, and the second drive gear 41 are removed. Instead, the motor generator 60 is provided to the drive shaft 19. The motor generator 60 is also a well-known motor generator which functions as an electric motor and an electric generator, as with the first MG 3 and the second MG 4. In the vehicle 1M, even if the power transmission between the first input shaft 13 and the first output shaft 17 is shut off, it is possible to drive the drive wheels 6 by means of the motor generator 60. Due to this, also with respect to the vehicle 1M, it is possible to control the transmission 10 by implementing the transmission control routine shown in FIG. 13. Due to this, it is possible to obtain function effects similar to the above embodiment. In the vehicle 1M, the motor generator 60 corresponds to the electric motor of the present invention.

Further, the transmission 10 to which the present invention is applied is not limited to the transmissions in the above mentioned embodiments. The present invention may be applied to vehicles which come with various kinds of transmission, as long as the transmission has 4n+2 sets of gear trains, where gear trains corresponding to odd-numbered stages and a gear train corresponding to an even-numbered stage which is one of fourth and higher speed stages (hereinafter, referred to as the "specific even-numbered stage") intervene between the first input shaft 13 and the first output shaft 17, and between the second input shaft 14 and the second output shaft 18, gear trains corresponding to remaining speed stages except the specific even-numbered stage within the even-numbered stages intervene. Concretely, such a transmission is a dual clutch transmission providing forward 6 speed stages, forward 10 speed stages, forward 14 speed stages or the like. The specific even-numbered stage is, for example, the fourth speed stage, the sixth speed stage, the eighth speed stage, or the like. With respect to even the vehicle which comes with such a transmission, it is possible to suppress the gear change shock by implementing the transmission control routine shown in FIG. 2 to execute the shift-down from the specific even-numbered stage to the speed stage which is one stage lower.

The present invention is not limited to the above embodiments, and may be applied to various kinds of embodiments. For example, though the input shaft and the motor generator are connected in a power transmittable manner via the gears in the above mentioned embodiments, the output shaft of the motor generator and the input shaft may be directly connected to each other.

Ninth Embodiment

Figure 16:
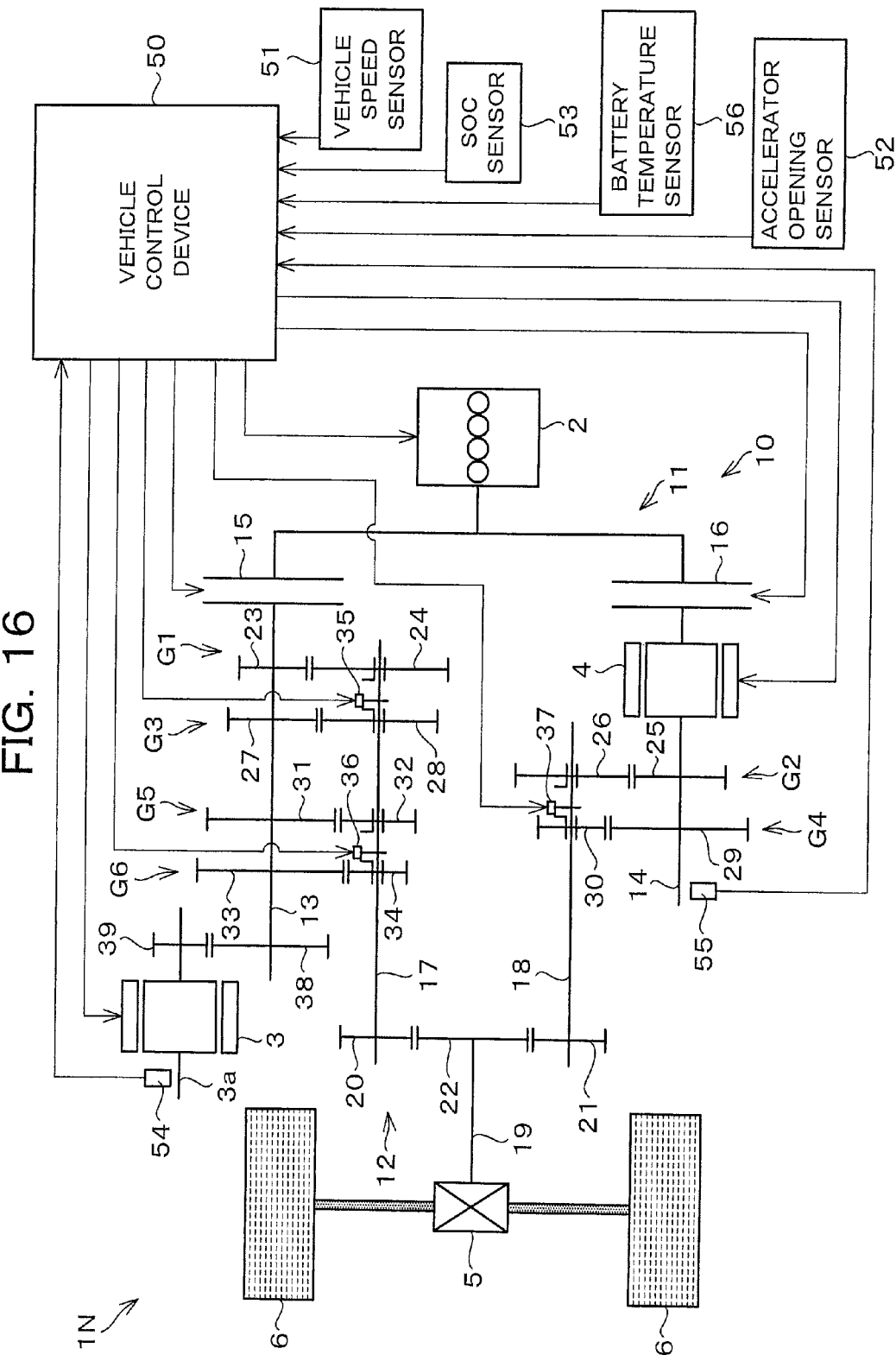
FIG. 16 is a diagram schematically showing a hybrid vehicle according to a ninth embodiment of the preset invention.

Next, referring to FIG. 16 and FIG. 17, a hybrid vehicle according to a ninth embodiment of the present invention will be described. In the present embodiment, signs shared with the above mentioned embodiments denote portions shared with the above mentioned embodiments respectively, and the explanations of the shared portions will be omitted. FIG. 16 shows a hybrid vehicle 1N according to the present embodiment. As shown in this figure, in the present embodiment, the second MG 4 is provided to the second input shaft 14. In the present embodiment, connected to the vehicle control device 50 are: the vehicle speed sensor 51; the accelerator opening sensor 52; the SOC sensor 53; a first MG rotational speed sensor 54; a second MG rotational speed sensor 55; and a battery temperature sensor 56. The first MG rotational speed sensor 54 outputs a signal corresponding to the rotational speed of the output shaft 3a of the first MG 3. The second MG rotational speed sensor 55 outputs a signal corresponding to the rotational speed of the second MG 4, that is, the rotational speed of the second input shaft 14. The battery temperature sensor 56 outputs a signal corresponding to the temperature of the battery.

Also, in the preset embodiment, the vehicle control device 50 changes the traveling mode of the vehicle 1 based on the vehicle speed and the like. The vehicle control device 50 changes the speed stage of the transmission 10 based on the vehicle speed and the accelerator opening degree. As shown in the figure, in the transmission 10, the fifth gear train G5 corresponding to the fifth speed stage and the sixth gear train G6 corresponding to the sixth speed stage intervene between the first input shaft 13 and the first output shaft 17. With respect to the gear train G5 and the gear train G6, the state of connection to the first output shaft 17 is controlled by means of the second sleeve 36 shared by the gear trains G5 and G6. Due to this, it is impossible to connect both of the gear trains G5 and G6 to the first output shaft 17 at the same time. Then, beforehand, while the second MG 4 is capable of assisting the drive wheels 6 to be driven, the vehicle control device 50 changes the speed stage of the transmission 10 from the sixth speed stage to the fifth speed stage.

Figure 17:
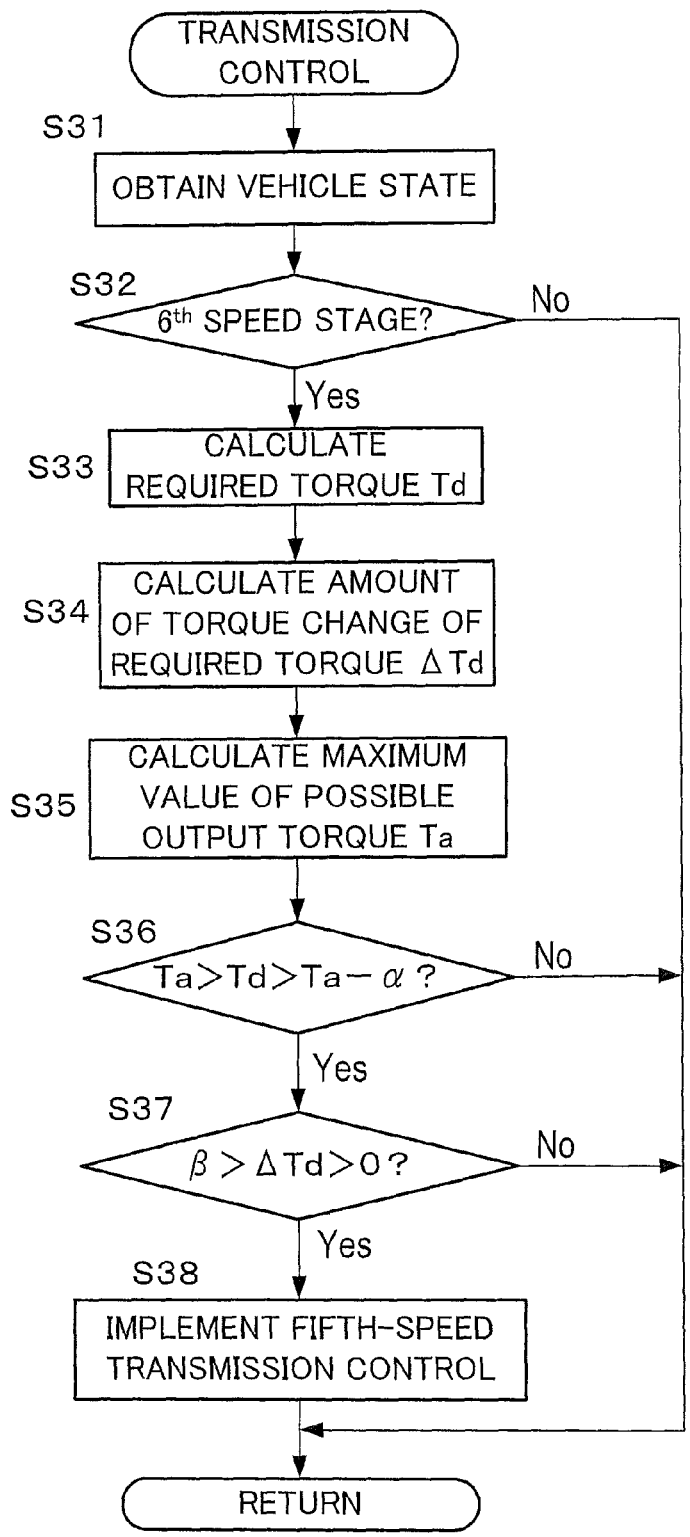
FIG. 17 is a flow chart showing a transmission control routine executed by a vehicle control device of the hybrid vehicle according to the ninth embodiment.

FIG. 17 shows a transmission control routine the vehicle control device 50 implements to control the transmission 10 in the mentioned way. This control routine is implemented repeatedly at predetermined intervals while the vehicle 1N is traveling. The vehicle control device 50 functions as the gear changing device of the present invention by implementing this control routine.

In this control routine, first, the vehicle control device 50 obtains the state of the vehicle 1N at step S31. As the state of the vehicle 1N, obtained are the vehicle speed, the accelerator opening degree, the rotational speed of the output shaft 3a of the first MG 3, the rotational speed of the second MG 4, and the state of charge of the battery, the temperature of the battery, and the current speed stage, for example. At this step, in addition to the above mentioned kinds of information, other kinds of information with respect to the state of the vehicle 1N are also obtained. At the next step S32, the vehicle control device 50 determines whether or not the speed stage of the transmission 10 is the sixth speed stage. When determining that the speed stage of the transmission 10 is any one of the first to the fifth speed stages, the vehicle control device 50 ends the control routine of the current turn.

On the other hand, when determining that the speed stage of the transmission 10 is the sixth speed stage, the vehicle control device 50 goes to step S33 to calculate a torque (required torque) Td required by a driver to the vehicle 1N. The required torque Td may be calculated based on the accelerator opening degree and the vehicle speed by using a well-known calculation method. For example, a relation between the accelerator opening degree, the vehicle speed, and the required torque Td may be calculated by some experiments, some numerical calculations or the like, and stored as a map in the ROM of the vehicle control device 50 beforehand. Then, the vehicle control device 50 may refer to the map to calculate the required torque Td.

At the next step S34, the vehicle control device 50 calculates a difference (hereinafter, referred to as the amount of torque change) ΔTd between the required torque Td calculated at the current turn and the required torque calculated at the previous turn. Subsequently, at step S35, the vehicle control device 50 calculates the maximum value of torque (hereinafter, referred to as the maximum torque) Ta the second MG 4 is capable of outputting. As known well, the torque the second MG 4 is capable of outputting varies depending on the state of the charge of the battery, the temperature of the battery, and the rotational speed of the second MG 4 at the moment when the second MG 4 is made to assist the drive wheels 6 to be driven. Due to this, the maximum torque Ta also varies depending on the above parameters. For example, the smaller the residual quantity of the battery is or the higher the temperature of the battery is, the smaller the maximum torque Ta is. The higher the rotational speed is, the smaller the maximum torque Ta is. The rotational speed may be calculated based on the current vehicle speed and the gear ratio of the fourth gear train G4. Beforehand, the relation between the current vehicle speed, the gear ratio and the maximum torque are obtained by some experiments, some numerical calculations, or the like and stored as a map in the ROM of the vehicle control device 50. The maximum torque Ta may be calculated by referring to the map.

At the next step S36, the vehicle control device 50 determines whether or not the required torque Td is larger than a value obtained by subtracting a predetermined determination value α from the maximum torque Ta and also smaller than the maximum torque Ta. The determination value α is a value set for making a determination whether or not the required torque Td is close to the maximum torque Ta. For example, a few Nm (newton-meters) is set as the determination value α. Thereby, the maximum torque Ta is a upper limit of a range between the value obtained by subtracting the determination value α from the maximum torque Ta and the maximum torque Ta. And, the range between the value obtained by subtracting the determination value α from the maximum torque Ta and the maximum torque Ta is set to the neighborhood of the maximum torque Ta. When determining that the required torque Td is the value obtained by subtracting the determination value α from the maximum torque Ta or smaller, or the required torque Td is the maximum torque Ta or larger, the vehicle control device 50 ends the control routine of the current turn.

On the other hand, when determining that the required torque Td is larger than the value obtained by subtracting the determination value α from the maximum torque Ta and also smaller than the maximum torque Ta, the vehicle control device 50 goes to step S37 to determine whether or not the amount of torque change ΔTd is larger than zero and also smaller than a determination upper limit S. The determination upper limit β is a value set as a criterion for making a determination whether or not the state of change of the required torque is moderate. For example, a few Nm (newton-meters) is set as the determination upper limit β. When determining that the amount of torque change ΔTd is zero, or the amount of torque change ΔTd is the determination upper limit β or larger, the vehicle control device 50 ends the control routine of the current turn.

On the other hand, when determining that the amount of torque change ΔTd is larger than zero and also smaller than the determination upper limit, the vehicle control device 50 goes to step S38 to implement the fifth-speed transmission control. In the fifth-speed transmission control, the vehicle control device 50 changes the position of the third sleeve 37 to the fourth speed position. Subsequently, the vehicle control device 50 changes the position of the second sleeve 36 to the released position while controlling the second MG 4 to output the required torque therefrom. After that, the vehicle control device 50 changes the position of the second sleeve 36 to the fifth speed position. In the engine traveling mode, at this moment, the state of the first clutch 15 is changed to the released state for a while. In the EV traveling mode, this processing is not necessary. And, the vehicle control device 50 makes the engine 2 or the first MG 3 output the required torque. After that, the vehicle control device 50 ends the control routine of the current turn.

As above mentioned, in the present invention, in such a case that the required torque Td is larger than the value obtained by subtracting the determination value α from the maximum torque Ta and also smaller than the maximum torque Ta, and the amount of torque change ΔTd is larger than zero and also smaller than the determination upper limit 13, the speed stage of the transmission 10 is changed from the sixth speed stage to the fifth speed stage. That is, in the case that the required torque Td is the neighborhood of the maximum torque Ta of the second MG 4, at the moment when the second MG 4 is capable of assisting the drive wheels 6 to be driven, the speed stage of the transmission 10 is changed to the fifth speed stage. Due to this, it is certainly possible to assist the drive wheels 6 to be driven by means of the second MG 4 at the moment of this gear change to the fifth speed stage. Accordingly, it is possible to suppress the gear change shock from occurring in gear change. Since it is possible to suppress the shift-down from the sixth speed stage to the fourth speed stage, it is possible to suppress the rotational speed of the engine 2 from suddenly rising in gear change. Due to this, it is possible to reduce a feeling of strangeness which might be given to the driver.

In the above embodiment, the range between the value obtained by subtracting the determination value α from the maximum torque Ta and the maximum torque Ta corresponds to the assist determination rage of the present invention. The range between zero and the determination upper limit β corresponds to the determination range of the present invention. The vehicle control device 50 functions as the assistive device of the present invention by implementing step S38 shown in FIG. 17.

The transmission 10 of the vehicle which the present invention can be applied to is not limited to the above mentioned transmissions. The present invention may be applied to vehicles which come which various kinds of transmissions, as long as the transmission has 4n+2 sets of gear trains, where gear trains corresponding to odd-numbered stages and a gear train corresponding to one of even-numbered stages (hereinafter, referred to as the "specific even-numbered stage") intervene between the first input shaft 13 and the first output shaft 17, and between the second input shaft 14 and the second output shaft 18, gear trains corresponding to remaining speed stages except the specific even-numbered stage within the even-numbered stages intervene. Concretely, such a transmission is a dual clutch transmission providing forward 6 speed stages, forward 10 speed stages, forward 14 speed stages or the like. The specific even-numbered stage is, for example, the fourth speed stage, the sixth speed stage, the eighth speed stage, or the like. With respect to even the vehicle which comes with such a transmission, it is possible to suppress the gear change shock by implementing the transmission control routine shown in FIG. 2 to execute the shift-down from the specific even-numbered stage to the speed stage which is one stage lower.

The present invention is not limited to the above mentioned embodiment, and may be executed in various kinds of embodiments. For example, the first MG may be directly connected to the input shaft, as with the second MG. Further, as with the first MG, the second MG may be connected to the input shaft via the gears in a power transmittable manner.

The vehicle to which the present application would be applied, is not limited to the vehicle shown in the above embodiments. For example, the present invention may be applied to a vehicle where the first MG has been removed from the vehicles of the above embodiments. Further, the present invention may be also applied to a vehicle where the first MG and the second MG have been removed and a motor generator has been provided to the drive shaft.

The invention claimed is:
1. A hybrid vehicle comprising
an internal combustion engine, and
a transmission as a dual clutch transmission having:
an input system including a first input shaft connected to the internal combustion engine via a first clutch and a second input shaft connected to the internal combustion engine via a second clutch;

an output system connected to drive wheels in a power transmittable manner;

4n+2 (n: integer one or more) sets of gear trains provided in such a way that one part of the 4n+2 sets of gear trains intervene between the first input shaft and the output system and all remaining sets of gear trains intervene between the second input shaft and the output system, the 4n+2 sets of gear trains corresponding to speed stages for forward travel respectively, the speed stages being different from each other in a gear ratio; and a plurality of connecting mechanisms, each of the plurality connecting mechanisms being provided between a pair of gear trains which are arranged next to each other within the 4n+2 sets of gear trains to selectively realize rotational transmission by one of the pair of gear trains, wherein with respect to the 4n+2 sets of gear trains, 2n+2 sets of gear trains intervene between the first input shaft and the output system, and remaining 2n sets of gear trains intervene between the second input shaft and the output system, and the hybrid vehicle further comprises an electric motor provided so as to output power to the second input shaft or the output system.

2. The hybrid vehicle according to claim 1, wherein only one gear train group is provided between the first input shaft and the output system, the gear train group being composed of two of the gear trains corresponding to speed stages which are next to each other respectively.

3. The hybrid vehicle according to claim 1, wherein the 4n+2 sets of gear trains intervene between the input system and the output system in such a way that: the gear train corresponding to a specific even-numbered stage which is one of even-numbered stages and the gear train corresponding to a specific odd-numbered stage which is either one of an odd-numbered stage which is one stage lower or an odd-numbered stage which is one stage higher than the specific even-numbered stage intervene between the first input shaft and the output system; and also, with respect to the gear trains corresponding to remaining speed stages except the specific even-numbered stage and the specific odd-numbered stage, even numbered gear trains intervene between the first input shaft and the output system and even numbered gear trains intervene between the second input shaft and the output shaft.

4. The hybrid vehicle according to claim 3, further comprising a computer implementing a predetermined computer program to make the computer function as a control device which is configured to control the electric motor, in a case that a speed stage is changed from one of the specific even-numbered stage and the specific odd-numbered stage to another one of the specific even-numbered stage and the specific odd-numbered stage, to suppress fluctuation of power to be transmitted to the drive wheels.

5. The hybrid vehicle according to claim 4, wherein the specific even-numbered stage is a highest stage within speed stages of the transmission, and the specific odd-numbered stage is an odd-numbered stage which is one stage lower than the highest stage, and the computer of the hybrid vehicle further functions by implementing the predetermined computer program, as a gear change banning device which is configured to, in a case of determining that fluctuation of power to be transmitted to the drive wheels is impossible to suppress by the electric motor when a gear change from one of the specific even-numbered stage and the specific odd-numbered stage to another one of the specific even-numbered stage and the specific odd-numbered stage has been required, ban the gear change.

6. The hybrid vehicle according to claim 1, wherein the transmission is the dual clutch transmission such that, with respect to the 4n+2 sets of gear trains, the gear trains corresponding to odd-numbered stages and one of the gear trains corresponding to a specific even-numbered stage which is one of fourth or higher even-numbered stages intervene between the first input shaft and the output system, while gear trains corresponding to remaining even-numbered stages except the specific even-numbered stage intervene between the second input shaft and the output system, the first clutch and the second clutch are controlled to connect any one of the first input shaft and the second input shaft to the internal combustion engine in a power transmittable manner, and also to shut off power transmission between another one of the first input shaft and the second input shaft and the internal combustion engine, and the hybrid vehicle further comprises a computer implementing a predetermined computer program to make the computer function as a transmission control device which is configured, in a case that shift-down for changing the speed stage of the transmission from the specific even-numbered stage to a speed stage which is one stage lower than the specific even-numbered stage is required when the hybrid vehicle is traveling with the internal combustion engine in a state that the speed stage of the transmission has been changed to the specific even-numbered stage, to change the speed stage of the transmission from the specific even-numbered stage to the speed stage which is one stage lower than the specific even-numbered stage with driving the drive wheels by the electric motor when fluctuation of drive power of the hybrid vehicle at a moment of the shift-down is capable of being reduced by the electric motor, and to change the speed stage of the transmission from the specific even-numbered stage to the speed stage which is two stages lower than the specific even-numbered stage with controlling the second clutch to transmit power of the internal combustion engine to the second input shaft when the fluctuation of drive power of the hybrid vehicle at a moment of the shift-down is impossible to be reduced by the electric motor.

7. The hybrid vehicle according to claim 6, wherein the transmission is provided with six sets of gear trains, and the specific even-numbered state is a sixth speed stage.

8. The hybrid vehicle according to claim 1, wherein the transmission is the dual clutch transmission such that, with respect to the 4n+2 sets of gear trains, the gear trains corresponding to odd-numbered stages and one of the gear trains corresponding to a specific even-numbered stage which is one of even-numbered stages intervene between the first input shaft and the output system, while the gear trains corresponding to remaining even-numbered stages except the specific even-numbered stage intervene between the second input shaft and the output system, and the hybrid vehicle further comprises a computer implementing a predetermined computer program to make the computer function as a gear changing device which is configured to change the speed stage of the transmission from the specific even-numbered stage to an odd-numbered stage which is one stage lower than the specific even-numbered stage, in a case that, when the hybrid vehicle is traveling in a state that the speed stage of the transmission has been changed to the specific even-numbered stage, a required torque which is required to the hybrid vehicle is within a predetermined assist determination range where a maximum value of torque the electric motor capable of outputting is an upper limit, and also that an amount of torque change of the required torque is within a predetermined determination range set beforehand.

9. The hybrid vehicle according to claim 8, wherein the specific even-numbered stage is a highest stage of the transmission.

10. The hybrid vehicle according to claim 8, wherein the upper limit of the assist determination range is the maximum value of torque the electric motor capable of outputting and the assist determination range is set to a neighborhood of the maximum value.

11. The hybrid vehicle according to claim 8, wherein the computer functions by implementing the predetermined computer program, as the gear changing device which is configured to include an assistive device which is configured to, in a case that the speed stage of the transmission is changed from the specific even-numbered stage to the odd-numbered stage which is one stage lower than the specific even-numbered stage, control the electric motor so as not to fluctuate power to be transmitted to the drive wheels in gear change.

* * * * *